(12) United States Patent
Korjus et al.

(10) Patent No.: US 11,741,709 B2
(45) Date of Patent: Aug. 29, 2023

(54) METHOD AND SYSTEM FOR ANALYZING SURROUNDINGS OF AN AUTONOMOUS OR SEMI-AUTONOMOUS VEHICLE

(71) Applicant: Starship Technologies OÜ, Tallinn (EE)

(72) Inventors: Kristjan Korjus, Tallinn (EE); Sergii Kharagorgiiev, Tallinn (EE); Ahti Heinla, Tallinn (EE); Tanel Pärnamaa, Tallinn (EE)

(73) Assignee: Starship Technologies OÜ, Tallinn (EE)

( * ) Notice: Subject to any disclaimer, the term of this patent is extended or adjusted under 35 U.S.C. 154(b) by 178 days.

(21) Appl. No.: 17/057,086

(22) PCT Filed: May 20, 2019

(86) PCT No.: PCT/EP2019/063003
§ 371 (c)(1),
(2) Date: Nov. 19, 2020

(87) PCT Pub. No.: WO2019/224162
PCT Pub. Date: Nov. 28, 2019

(65) Prior Publication Data
US 2021/0209367 A1 Jul. 8, 2021

(30) Foreign Application Priority Data

May 22, 2018 (EP) .................................... 18173530
Dec. 21, 2018 (EP) .................................... 18215499

(51) Int. Cl.
*G06V 20/00* (2022.01)
*G06V 20/58* (2022.01)
*G06V 40/10* (2022.01)

(52) U.S. Cl.
CPC .............. *G06V 20/38* (2022.01); *G06V 20/58* (2022.01); *G06V 40/10* (2022.01)

(58) Field of Classification Search
CPC ........ G06V 20/38; G06V 20/58; G06V 20/10; G06V 20/56; G06V 40/10
See application file for complete search history.

(56) References Cited

U.S. PATENT DOCUMENTS 4,549,841 A 10/1985 Ishige
5,664,928 A 9/1997 Stauber
(Continued)

FOREIGN PATENT DOCUMENTS

CN 104267726 A * 1/2015
CN 106599832 A * 4/2017
(Continued)

OTHER PUBLICATIONS

Translated version of WO2018038553 (Year: 2018).*
(Continued)

*Primary Examiner* — Carol Wang
(74) *Attorney, Agent, or Firm* — Siritzky Law, PLLC

(57) ABSTRACT

Disclosed are a system and methods for operating an autonomous or semi-autonomous vehicle. One method comprises travelling in an outdoor setting, capturing data related to the outdoor setting, processing captured data and identifying occlusion present in the preprocessed data. The system comprises an autonomous or semi-autonomous vehicle configured to travel in outdoor settings and comprising at least one first sensor and at least one processing component. The processing component is configured to process data captured by the first sensor and identify occlusion present in the preprocessed data.

53 Claims, 7 Drawing Sheets

(56) References Cited

U.S. PATENT DOCUMENTS

| | | |
|---|---|---|
| 5,942,869 A | 8/1999 | Katou et al. |
| 6,467,293 B1 | 10/2002 | Goosman |
| 6,602,037 B2 | 8/2003 | Winkler |
| 7,073,634 B2 | 7/2006 | Mitchell et al. |
| 7,320,289 B1 | 1/2008 | Clarke et al. |
| 7,894,939 B2 | 2/2011 | Zini et al. |
| 7,931,431 B2 | 4/2011 | Benedict et al. |
| 8,010,230 B2 | 8/2011 | Zini et al. |
| 8,104,601 B2 | 1/2012 | Hayduchok et al. |
| 8,204,624 B2 | 6/2012 | Zini et al. |
| 8,485,285 B2 | 7/2013 | Ferrigni |
| 8,874,360 B2 | 10/2014 | Klinger et al. |
| 8,948,914 B2 | 2/2015 | Zini et al. |
| 9,020,632 B2 | 4/2015 | Naylor |
| 9,031,692 B2 | 5/2015 | Zhu |
| 9,244,147 B1 | 1/2016 | Soundararajan et al. |
| 9,256,852 B1 | 2/2016 | Myllymaki |
| 9,266,675 B2 | 2/2016 | Yamashita |
| 9,302,678 B2 | 4/2016 | Murphy et al. |
| 9,373,149 B2 | 6/2016 | Abhyanker |
| 9,557,740 B2 | 1/2017 | Crawley |
| 9,561,941 B1 | 2/2017 | Watts |
| 9,694,976 B1 | 7/2017 | Wurman et al. |
| 9,741,010 B1 | 8/2017 | Heinla |
| 9,844,879 B1 | 12/2017 | Cousins et al. |
| 2001/0018640 A1* | 8/2001 | Matsunaga .......... G05D 1/0274 382/168 |
| 2003/0165373 A1 | 9/2003 | Felder et al. |
| 2005/0207876 A1 | 9/2005 | Springwater |
| 2006/0237239 A1 | 10/2006 | Bruner et al. |
| 2008/0215184 A1* | 9/2008 | Choi ..................... G06V 10/255 901/47 |
| 2012/0090110 A1 | 4/2012 | Van Den Berg et al. |
| 2013/0110281 A1 | 5/2013 | Jones et al. |
| 2013/0240673 A1 | 9/2013 | Schlosser et al. |
| 2013/0332021 A1 | 12/2013 | Goren |
| 2014/0136414 A1 | 5/2014 | Abhyanker |
| 2014/0254896 A1 | 9/2014 | Zhou et al. |
| 2014/0365258 A1 | 12/2014 | Vestal et al. |
| 2015/0006005 A1 | 1/2015 | Yu et al. |
| 2015/0045945 A1 | 2/2015 | Zini et al. |
| 2015/0100152 A1 | 4/2015 | Barragán Treviño et al. |
| 2015/0183581 A1 | 7/2015 | Worsley |
| 2015/0379468 A1 | 12/2015 | Harvey |
| 2016/0185466 A1 | 6/2016 | Dreano, Jr. |
| 2016/0188977 A1 | 6/2016 | Kearns et al. |
| 2016/0207710 A1 | 7/2016 | Conrad et al. |
| 2016/0325928 A1 | 11/2016 | Lepek et al. |
| 2016/0355337 A1 | 12/2016 | Lert et al. |
| 2016/0368464 A1 | 12/2016 | Hassounah |
| 2017/0017237 A1 | 1/2017 | Tokuyama et al. |
| 2017/0100837 A1 | 4/2017 | Zevenbergen et al. |
| 2017/0185853 A1 | 6/2017 | Yokota et al. |
| 2017/0220981 A1 | 8/2017 | Shucker et al. |
| 2017/0240096 A1* | 8/2017 | Ross ..................... B60Q 5/005 |
| 2017/0267452 A1 | 9/2017 | Goren et al. |
| 2017/0369051 A1 | 12/2017 | Sakai et al. |
| 2018/0020896 A1 | 1/2018 | High et al. |
| 2018/0107216 A1 | 4/2018 | Beaurepaire et al. |
| 2018/0259966 A1* | 9/2018 | Long ..................... G05D 1/0088 |
| 2018/0279847 A1* | 10/2018 | Park ..................... A47L 9/2868 |
| 2018/0297210 A1* | 10/2018 | Peterson ............... B25J 19/023 |
| 2018/0349834 A1 | 12/2018 | Heinla et al. |
| 2020/0391745 A1* | 12/2020 | Mori ..................... G06T 7/00 |

FOREIGN PATENT DOCUMENTS

| | | | | |
|---|---|---|---|---|
| CN | 107092252 A | * | 8/2017 | |
| DE | 112006003007 T5 | * | 10/2008 | ............... B60T 7/22 |
| JP | 2004086779 A | * | 3/2004 | ......... G06K 9/00651 |
| JP | 3585071 B2 | * | 11/2004 | |
| KR | 10-2013-0112507 A | | 10/2013 | |
| KR | 101823029 B1 | * | 1/2018 | |
| WO | 2011/035839 A2 | | 3/2011 | |
| WO | 2017/064202 A1 | | 4/2017 | |
| WO | 2017/076929 A1 | | 5/2017 | |
| WO | WO-2018038553 A1 | * | 3/2018 | ............... A47L 9/28 |

OTHER PUBLICATIONS

Translated version of KR101823029 (Year: 2018).*
Translated version of JP3585071 (Year: 2004).*
Translated version of JP2004086779 (Year: 2004).*
Translated version of DE112006003007 (Year: 2008).*
Translated version of CN107092252 (Year: 2017).*
Translated version of CN106599832 (Year: 2017).*
Translated version of CN104267726 (Year: 2015).*
Robinson, Melia, "Tiny self-driving robots have started delivering food on-demand in Silicon Valley—take a look", Apr. 30, 2018, 18 pages.
Radwan, Noha et al., "Why did the robot cross the road?—Learning from multi-modal sensor data for autonomous road crossing", 2017 IEEE/RSJ International Conference on Intelligent Robots and Systems (IROS), Sep. 24-28, 2017, Vancouver, BC, Canada, 6 pages.
Hsu, Tsung-Shiang et al., "An improvement stereo vision images processing for object distance measurement", International Journal of Automation and Smart Technology, AUSMT vol. 5, No. 2, 6 pages, Jun. 1, 2015, XP002793529.
Kang, Lei et al., "Augmenting Self-Driving with Remote Control: Challenges and Directions", 2018 Association for Computing Machinery, HotMobile '18, Feb. 12-13, 2018, Tempe, AZ, 6 pages, XP002793539.
Li, Sugang et al., "Auto++ : Detecting Cars Using Embedded Microphones in Real-Time", Proceedings of the ACM on Interactive, Mobile, Wearable and Ubiquitous Technologies, vol. 1, No. 3, Article 70, 20 pages, Sep. 2017.
Baker, Michael et al., "Automated Street Crossing for Assistive Robots", Proceedings of the 2005 IEEE, http://citeseerx.ist.psu.edu/viewdoc/download?doi=10.1.1.124.2156&rep=rep1&type=pdf, Jun. 28, Jul. 1, 2005, 6 pages.
Pettitt, Jeniece, "Forget delivery drones, meet your new delivery robot", Retrieved from the Internet: URL: https://www.cnbc.com/2015/11/02/forget-delivery-drones-meet-your-new-delivery-robot.html, Nov. 2, 2015, 4 pages.
Jacobs, Stefan, "Klauen würde ich ihn nicht" ("I wouldn't steal him"), Retrieved from the Internet: URL: http://www.tagesspiegel.de/mobil/lieferroboter-starship-klauen-wuerde-ich-ihn-nicht/12647114.html, Nov. 29, 2015, 4 pages, English translation provided herewith.
WIPO, International Search Report for International Application No. PCT/EP2019/063003, dated Aug. 27, 2019, 4 pages.
WIPO, Written Opinion for International Application No. PCT/EP2019/063003, dated Aug. 27, 2019, 4 pages.
WIPO, International Search Report for International Application No. PCT/EP2019/062999, dated Jul. 30, 2019, 4 pages.
WIPO, Written Opinion for International Application No. PCT/EP2019/062999, dated Jul. 30, 2019, 8 pages.

* cited by examiner

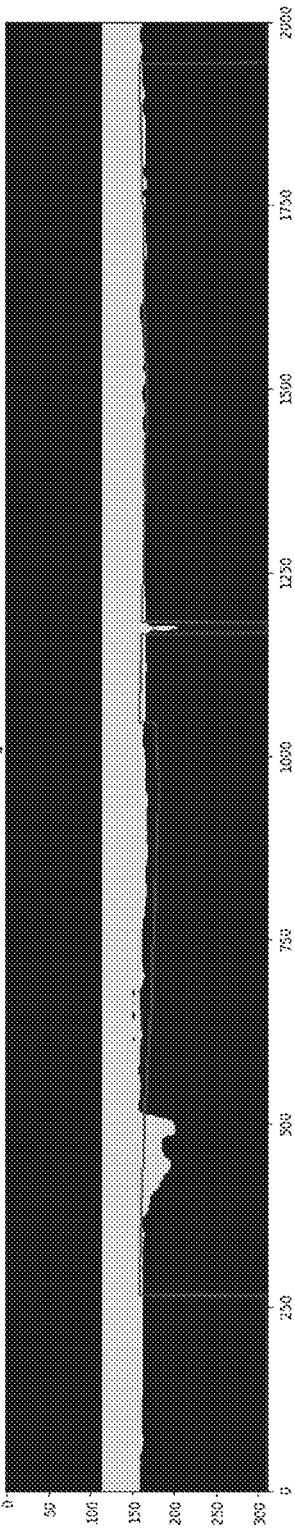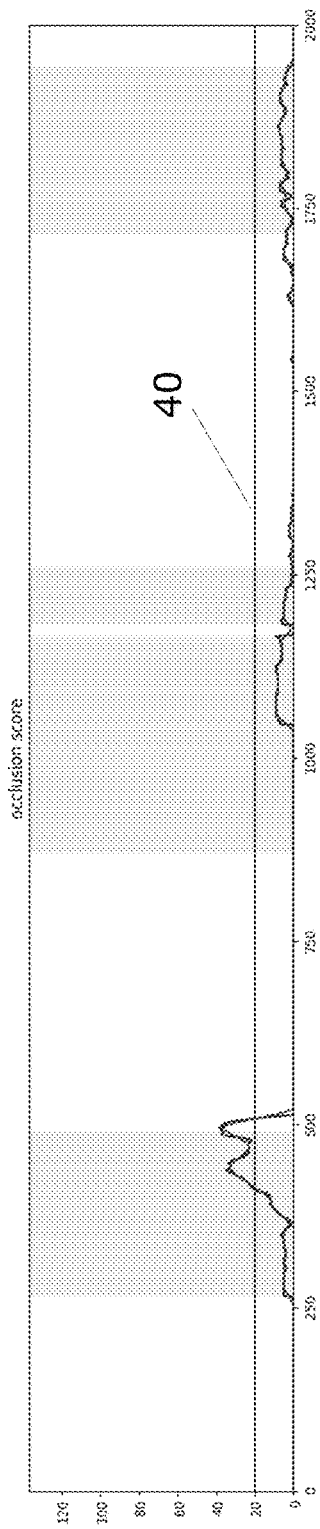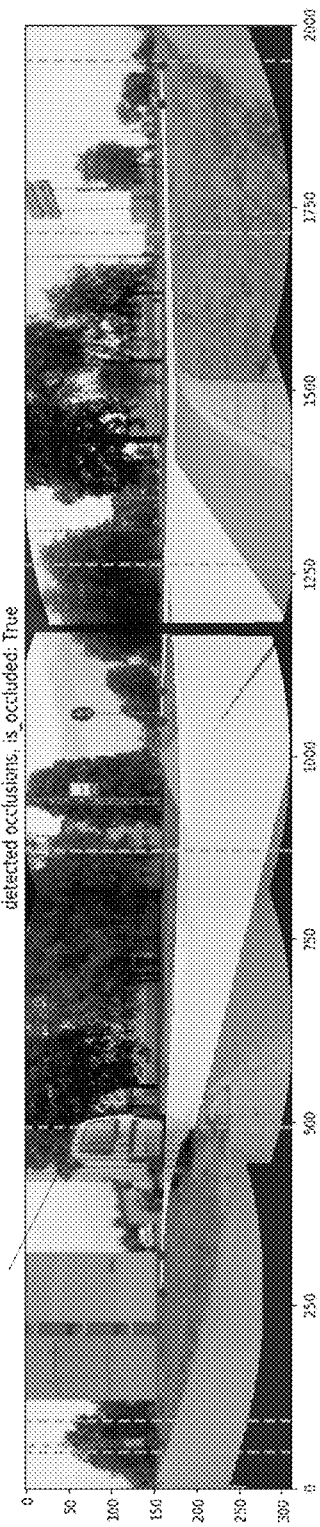

METHOD AND SYSTEM FOR ANALYZING SURROUNDINGS OF AN AUTONOMOUS OR SEMI-AUTONOMOUS VEHICLE

RELATED APPLICATIONS

This application is a 371 of International application PCT/EP2019/063003, filed May 20, 2019, the entire contents of which are hereby fully incorporated herein by reference for all purposes. PCT/EP2019/063003 claims the priority benefit of European patent applications EP 18215499.7 filed Dec. 21, 2018 and EP 18173530.9, filed May 22, 2018, the entire contents of both of which are hereby fully incorporated herein by reference for all purposes.

FIELD

The invention relates to operating mobile robots. More specifically, the invention relates to computer vision of mobile robots, particularly for increased safety of operations.

INTRODUCTION

Mobile robots are increasingly joining both vehicle and pedestrian traffic in outdoor surroundings. Such robots can operate by forming an image of their surroundings by using one or more sensors and computer vision algorithms. Operation of mobile robots integrated into outdoor commute can be facilitated by improved awareness of possible obstacles, identifying of other traffic pedestrians and cautious behavior. Such mobile robots can operate autonomously and/or semi-autonomously.

Mobile robots traveling on sidewalks and other pedestrian pathways generally need to cross traffic roads. This can be associated with an increased accident risk due to the presence of fast traveling vehicles on traffic roads. Therefore, reliably detecting moving vehicles can be important for autonomous operation of such mobile robots. As part of this detection, identifying whether moving vehicles are occluded or hidden by stationary objects can also be important.

Some such considerations are known in the art. For example, Korean patent application KR 2013/0112507 A provides a method for executing an optimum and safe routing plan to define danger areas in the entire route for safe autonomous navigation, compose a grid map using a repulsion function of recognition limited areas, and consider the danger repulsive power according to the level of danger, thereby establishing an optimum and safe routing plan.

SUMMARY

It is the object of the present invention to provide an improved, efficient and reliable way of operating mobile robots. It is further an object of the present invention to provide methods and systems for using computer vision to improve the safety and reliability of mobile robots. It is particularly also the object of the present invention to disclose a method and system for processing sensor data captured by mobile robots, particularly to improve the safety and efficiency of mobile robot operations.

In a first embodiment, a method for operating a mobile robot is disclosed. The method comprises traveling in an outdoor setting. The method also comprises capturing data related to the outdoor setting via at least one first sensor. The method further comprises processing captured data to identify areas of interest corresponding to at least one segment of the outdoor setting. The method also comprises identifying occlusion present in the preprocessed data.

The present method advantageously allows for increasing the safety, efficiency and reliability of mobile robot operations. Particularly useful is that the method can contribute to detecting moving objects that might be occluded or hidden from view by stationary objects. The moving objects may comprise vehicles or bicycles that may be occluded by vegetation or parked vehicles. Therefore, it can be very beneficial to detect that such occlusion has occurred, particularly if the trajectories of a hidden fast-moving object and the mobile robot might have otherwise intersected.

Traveling can refer to actuating the mobile robot so as to move generally substantially along a road, sidewalk and/or a pedestrian pathway. The mobile robot can travel by using a motion component such as wheels for example.

The outdoor setting can generally refer to unstructured environments generally located outside. For example, outdoor settings can comprise a city, a suburb, a village or another similar environment. The outdoor setting can generally refer to an outdoor surrounding where traffic roads are present.

The first sensor can comprise a visual sensor such as a camera, a plurality of cameras, stereo cameras, time of flight cameras or similar sensors. The first sensor can refer to a plurality of sensors, and the data of a plurality of sensors can be combined.

The data captured by the first sensor can comprise a plurality of visual images of the robot's surroundings thereby depicting the outdoor setting where the mobile robot is traveling.

The areas of interest can correspond to predefined areas such as roads, driveways, cycling lanes and other areas where vehicles or cyclists can travel. Such areas can be particularly interesting to identify, since fast moving objects traveling there can pose a danger to the mobile robot and need to be accurately and timely detected. This can be particularly important when the mobile robot (generally traveling on sidewalks or pedestrian pathways) is approaching a traffic road with the intention of crossing it. In other words, areas of interest can correspond to images of vehicle roads in the sensor data (preferably images) captured by the mobile robot. The segments of the outdoor setting then can correspond to the vehicle roads themselves.

Occlusion can hereby refer to something blocking or covering part of an area of interest, so that it is not depicted in the sensor data. For example, occlusion can refer to objects partially covering a traffic road in an image captured by the mobile robot. Occlusion can originate from vegetation, parked vehicles, sidewalk elements such as mailboxes and garbage bins or other such objects. Detecting occlusion in such sensor data can be particularly advantageous for mobile robot operations. If occlusion is present in sensor data, one cannot be certain that there is no fast-moving object such as a vehicle covered by it. Therefore, crossing a traffic road when occlusion is detected can be dangerous for a mobile robot. In this way, detecting occlusion advantageously allows to increase the safety of the mobile robot operations, since hidden or covered objects that otherwise would not be detected could endanger its operations.

In some embodiments, the method can further comprise comparing preprocessed data with stored map data indicative of the segment of the outdoor setting. The stored map data can comprise, for example, a map including traffic roads, such as open street map. The preprocessed data can also comprise a location indication that can be compatible with that of stored map data. In this way, segments of the outdoor setting such as roads, driveways and similar structures can be matched between preprocessed data and the stored map data. Even further, based on the stored map data corresponding to the outdoor setting around the mobile robot, certain roads might be expected to be seen in the robot's sensor data. If they are not then visible, this can indicate occlusion via other objects.

In some such embodiments, preprocessing captured data can further comprise discarding a predetermined part of the captured data. This predetermined part may comprise areas that are not in the vicinity of areas of interest in the data. For example, areas of images that are located far from roads visible in the images can be discarded. Additionally or alternatively, a predetermined part of the image, such as a top third or fourth, can be discarded. The precise threshold of how much of the image can be discarded can be computed based on where in the image the roads generally appear. This can also depend on sensor (in this case camera) angle and placement. Discarding some data before identifying occlusion can allow for quicker processing of the data and therefore efficient and more lean computation.

Preprocessing data can otherwise also comprise compressing data, stitching together a plurality of images to obtain a panorama or wider angle image, converting the colours of the image into a more useful or different spectrum, or otherwise performing operations on the data that prepare it to be processed in order to identify occlusion in it.

In some embodiments, preprocessing captured data can comprise segmenting it. This can allow to identify different elements corresponding to the outside surroundings present in the captured data. Segmenting can comprise dividing captured data into a plurality of different area types. That is, the outdoor surroundings captured via the mobile robot's sensor can be analyzed so as to identify different objects or area types (e.g. buildings, roads, vegetation, vehicles etc). Advantageously, segmentation can allow to focus on the particularly important parts of sensor data, corresponding to such parts of the mobile robot's surroundings that need to be analyzed for possible obfuscation.

The area types can comprise different objects or different kinds of surroundings. One area type can comprise traffic roads. Other area types can comprise roads, sidewalks, curbstones, terrain, person, vehicle, cycle, pole, building, tree, bush, fence, sky, mobile robot (such as particularly the applicant's mobile robot that may be referred to as "starship robot"), miscellaneous, rider, trunk or other area types.

In some embodiments, stored map data can comprise traffic road data. That is, stored map data can comprise a map of roads such as that from Open Street Map or similar. Stored map data can further comprise average traffic density for each road. This can be advantageous to know, since roads with higher average traffic density may be more challenging to cross, since, on average, there may be more moving vehicles occluded by stationary objects. Stored map data can also further comprise road difficulty parameter for each road. The road difficulty parameter can comprise one or a plurality of parameters reflecting the different characteristics of a road. For example, such characteristics can comprise average traffic density during a given day/time, number of traffic lanes, known permanent obfuscating objects (such as bushes close to the road), data on previous crossings of the road, amount of roads from which a turning vehicle might emerge onto the road in question, whether the road is a driveway or a traffic road, and other characteristics. These can all be combined into a single parameter (or a plurality of parameters) that can generally correspond to the difficulty or hazard that the mobile robot would be faced with when crossing the given road.

In some embodiments, stored map data can further comprise infinity points. Infinity points can correspond to vanishing points of an image of a road. Such points can refer to the intersection of lines corresponding to road edges in the distance. Including the infinity points as part of stored map data can advantageously allow for easier matching between stored map data and sensor data taken by the mobile robot. In other words, matching the infinity points of the roads between stored map data and preprocessed data can allow for accurate and quick identification of the roads that the robot is approaching and that may be partially occluded.

In some embodiments, comparing preprocessed data with stored map data can comprise projecting stored map data onto coordinates of the preprocessed data. That is, stored map data can be combined with the preprocessed data in such a way, that matching areas and objects are superimposed. This can advantageously allow for detecting differences between the stored map data and the preprocessed data which may indicate occlusion.

In some embodiments, comparing preprocessed data with stored map data can further comprise identifying position of infinity points in the preprocessed data. That is, vanishing or infinity points corresponding preferably to roads, such as traffic roads, can be identified in the preprocessed data. This can allow to better and more efficiently map stored map data with preprocessed data for example. Additionally, attempting to locate the infinity points in the preprocessed data and not locating all of the expected points may indicate that occlusion is present.

In some embodiments, comparing preprocessed data with stored map data can further comprise identifying traffic roads with road difficulty parameter exceeding a particular threshold in the preprocessed data. That is, roads which may be more difficult or dangerous to cross for the mobile robot may be identified in the preprocessed data by comparing it with the stored map data (which may comprise the road difficulty parameter). The threshold may be set based on previous experience and/or different times of day, days of the week, weather and light conditions and similar. The threshold may also be adjusted dynamically. Advantageously, this may allow to, for example, allocate more computational power to detecting possible occlusions during a snowstorm or during rush hour.

In some such embodiments, the method can further comprise assigning an occlusion score to each potential detected occlusion. In other words, each candidate for occlusion in the preprocessed data may be quantitatively assessed, with the score representing the confidence of the algorithm in the presence of actual occlusion.

In some such embodiments, the method can further comprise comparing the occlusion score with a predetermined occlusion threshold and keeping occlusions with a score above the threshold. That is, based on previous performance of the algorithm (such as a neural network algorithm) and/or based on further parameters, there may be a predetermined threshold for deciding whether a potential candidate constitutes true occlusion or not. This threshold may be variable depending on several factors, such as the road difficulty parameter (which may itself be variable). Having such a threshold can allow for a pragmatic way of discriminating between false occlusion candidates and true occlusion candidates. The threshold may be biased toward a lower occlusion score, since it may be more important to have more false positive detections of occlusions than have more false negatives where occlusion was not detected.

In some embodiments, identifying occlusion can comprise running a neural network-based algorithm on a combination of the preprocessed data and stored map data. The combination of the preprocessed data and stored map data can comprise, for example, an image with known roads overlaid on top of it. That is, detecting whether occlusion is present in the mobile robot's sensor data can comprise running an algorithm previously trained on annotated data with known occlusion (and without such). This can be useful, as neutral network-based algorithms have been known to reliably filter data based on predetermined characteristics.

In some such embodiments, the neural network-based algorithm can be run on the occlusions with the occlusion score above the predetermined occlusion threshold. That is, identifying candidates for possible occlusions can be done by a simpler and less computationally demanding algorithm than a machine learning one. Then, only parts of the sensor data (preferably image data) corresponding to the areas immediately surrounding possible occlusion candidates can be input into a neural network-based algorithm. Advantageously, this may allow to optimize the running time of the algorithm and therefore of occlusion detection. For example, the whole occlusion detection process starting from capturing sensor data to positively identifying occlusion (or the lack of it) may take on the order of a few seconds, preferably a second or less. It is of course also possible to implement the present method so that a machine learning algorithm is run on all of the sensor data without first identifying occlusion candidates via a quicker algorithm.

In some embodiments, the method can further comprise computing a distance range between the mobile robot and the identified occlusion. That is, the spatial separation between the robot and the occlusion may be computed. As the occlusion may extend over some space, and there may be some uncertainty as regards the precise location of the occlusion, the distance may not be a specific number, but rather a range. In some such embodiments, the method can further comprise discarding the occlusion if a minimum possible distance between the mobile robot and the identified occlusion is above a predetermined threshold. That is, if the detected occlusion is sufficiently far from the mobile robot, it may be practical to discard it, as it is unlikely that there may be a fast-moving object that would pose a risk to the mobile robot and that would be concealed by such an occlusion. In other words, occlusion that may be sufficiently far from the mobile robot may not be immediately important for safe and efficient operations. The threshold for such minimum occlusion distance can also be adjusted depending on the road difficulty parameter or other factors and may also be directly implemented (and trained for) into a neural network-based occlusion identifying algorithm.

In some embodiments, identifying occlusion comprises identifying at least one occluding object. That is, occlusion can refer to an occluding object or object that covers or hides or conceals preferably some part of the road.

In some embodiments, the method can further comprise identifying a type of occlusion present in the preprocessed data. That is, upon positively identifying occlusion, a further step may comprise detecting what the occlusion may correspond to. This can be important, as depending on the type of occlusion, different actions may need to be taken by the mobile robot. Further, different types of occlusions may pose different amounts of danger to the mobile robot crossing a road.

In some such embodiments, the type of occlusion can comprise at least one of vegetation, vehicle, pole, waste container, mailbox, and unidentified object. There may also be further types of occlusion (or occluding objects) that can be identified, such as public transportation stops, bike racks or other objects commonly encountered around sidewalks and traffic roads. Vegetation can comprise bushes, trees, decorative plants or other such objects. Vehicles can generally comprise parked vehicles. Poles can comprise street poles, such as lightning poles, electricity poles, traffic light poles or others. Waste containers can comprise garbage bins, recycling bins or similar.

In some embodiments, the method can further comprise executing an action, wherein said action can be selected based on the type of occlusion. As mentioned above, optimizing operations of a mobile robot traveling on pedestrian pathways, particularly while crossing traffic roads or driveways can comprise reacting to a detected occlusion in a certain way depending on the occlusion type. In some such embodiments, the action can comprise at least one of ceasing traveling, traveling a specified distance in a specified direction and contacting a remote operator. Ceasing traveling may comprise not attempting to cross a road (since a fast moving vehicle can be concealed behind an occlusion). Traveling in a certain direction can lead to the occlusion being resolved (that is, the occlusion may no longer be between the robot's sensors' line of sight and at least part of a road). Contacting a remote operator may allow for further assessment of the situation by an authorized person.

In some embodiments, the method can further comprise contacting a remote operator terminal in case identified occlusion exceeds a predetermined parameter. For example, if occlusion is sufficiently large so as to block a significant part of the road and/or an infinity (or vanishing) point, or is detected near a road with a high road difficulty parameter, the remote operator may be contacted. Such a predetermined parameter may also be variable based on further factors. In some such embodiments, the method can further comprise the remote operator terminal assuming control of the mobile robot after being contacted. That is, the mobile robot may be controlled remotely, at least until the occlusion can be resolved (either by moving in a certain direction, or by choosing a different route which would avoid crossing a road partially hidden by an occlusion).

In some embodiments, the method can further comprise identifying objects in the captured data and segmenting the captured data simultaneously. That is, the segmentation process and an object detection process can be run on the robot's sensor data simultaneously. As a result, the data (preferably an image or a composite image) can be segmented and objects present in it can be detected in one run through an algorithm. This can advantageously allow for optimization of computational resources and faster processing of the robot's data. Furthermore, identifying the types of occlusion or occluding objects may also be advantageously streamlined when segmentation and object detection are run simultaneously.

The sensors of the mobile robot preferably comprise one or more visual cameras. The cameras may be stereo cameras, individual cameras pointed in different directions and/or a combination of such cameras. The sensor data described in the present document can preferably comprise images taken by such cameras. Additionally or alternatively, the sensors of the mobile robot can also comprise one or more time of flight (ToF) sensors. The sensor data can then comprise frames taken by the time of flight sensors. It can be particularly advantageous to use the ToF sensors in reduced light conditions, such as at night. Therefore, preferably, the mobile robot may switch between using cameras and ToF sensors depending on ambient light conditions, time of day, weather and/or external instructions from a server or otherwise. Additionally or alternatively, the mobile robot may use both cameras and ToF sensors and combine the results by assigning different weights to the sensors based on various parameters. For example, the cameras and the ToF sensors may comprise different sensitivity at different distances from the mobile robot. In such a scenario, more weight may be assigned to a detected (or not detected) occlusion present at a distance where the sensitivity of either the camera or the ToF sensor is better.

In some embodiments, the first sensor may further comprise at least one of a visual camera and a time of flight (ToF) sensor. The captured data can comprise a plurality of frames captured by the first sensor. In some such embodiments, processing captured data can comprise detecting vehicles in the frames captured by the first sensor. Such embodiments can differ from those where captured data is segmented and different types of segments identified (where the segments can comprise roads, greenery and also parked cars as well). In the present case, the detection can particularly focus on detecting vehicles. In such embodiments, the method can further comprise identifying parked vehicles among the detected vehicles. In such embodiments, the mobile robot preferably comprises a plurality of visual cameras taking images of the mobile robot's surroundings.

Preferably, the vehicles can be detected by running a neural network-based detector. Both detection of all vehicles in the images, as well as identification of specifically parked vehicles can be performed via a neural network-based detector. Such a detector can preferably run directly on the robot (as opposed to on a server that the robot can communicate with). The robot can comprise a computing component particularly configured for image processing. For instance, the mobile robot may comprise a vision processing unit such as those from Movidius™. It can be particularly advantageous to have an occlusion detector operating directly on the mobile robot (that is, locally, as part of the mobile robot's processing tasks), since this can significantly optimize the time needed to detect occlusion (as a large part of the time may be spent communicating back and forth between the robot and a remote server).

Detecting the parked vehicles may comprise detecting candidate boxes and refining the estimate to better estimate the true position of vehicles. The position of such bounding boxes may be further smoothed out between frames of images taken by the robot's visual cameras. That is, there is preferably additional refining of the positions to avoid the bounding boxes moving between frames and creating an impression of moving vehicles rather than stationary ones. Such refining can further be performed via a neural-network based algorithm or sub-routine.

In some such embodiments, identifying occlusion can comprise evaluating parked vehicles' placement on a road. That is, by using the known structure of the road (obtained either by combining the robot's camera images with a map of the roads or by analyzing the images directly), it can be determined whether the parked vehicles are located on the side of the road closest to the mobile robot or furthest from it. This can be useful to determine which parked vehicles might be occluding the robot's view of the road, and thereby potentially covering possible moving vehicles.

In some such embodiments, identifying occlusion can further comprise detecting at least one detected parked vehicle that occludes at least a part of the road where moving vehicles may be present. That is, particularly cars parked on the side of the road closest to the mobile robot may be further analyzed. Such cars might be blocking part of the road from the view of the robot's cameras, and preventing it from detecting moving vehicles. A detection of such occlusion can comprise, for example, analyzing the images taken by the cameras to see whether a bounding box corresponding to a vehicle parked on the side of the road closest to the robot at least partially intersects the robot's cameras' line of sight corresponding to the directions that moving vehicles may come from.

The occlusion detector may be run directly on the mobile server, or, at least partially, on an external device such as a remote server. Occlusion detection may comprise computationally heavy steps, which may be quicker to run on a remote server than on the mobile robot directly. In such cases, the mobile robot may send captured data to a remote server, where it may be processed and occlusion identified. Additionally or alternatively, part of the occlusion detector may be performed externally. For example, the mobile robot may process the captured data itself, and an external server may only identify occlusion in the processed data.

In another method embodiment, a method comprising a data processing device determining whether a mobile robot road crossing is performed automatically and autonomously by the mobile robot or operator-based is disclosed.

In some such embodiments, the method can comprise determining whether there are any occluding obstacles that can occlude the vision of the mobile robot to the road. Occluding obstacles can be obstacles such as parked cars on the roadsides, trees, traffic signs, buildings, traffic participants that can be positioned between the mobile robot and the road, thus occluding the mobile robot's vision to the road or part of the road. It can be advantageous for the mobile robot to "see" the road, or a substantial part of the road, for determining to cross the road automatically and autonomously or operator-based. For example, the information whether there is a car driving on the road can facilitate the determination of how to cross the road. However, there can be present occluding obstacles, that can occlude part of the robot's vision, to the road. Due to occluding obstacles, the mobile robot cannot observe the true state (e.g. presence of a driving car) of the road, or part of the road. Thus, it can be advantageous to determine whether there are any occluding obstacles occluding the vision of the mobile robot to the road. It can allow the mobile robot to determine whether it can observe the true state of the road (i.e. no obstacles are present) or whether its view to the road is occluded. Such determination can be advantageous as it can increase safety. For example, it can reduce or eliminate the error of inferring that there are no moving cars on the road when there can actually be moving cars on the road. Such an error can be mostly caused because the view of the mobile robot to the road can be obstructed.

In some embodiments, the determination whether there are any occluding obstacles occluding the vision of the mobile robot to a road is facilitated by the determination of the position of the mobile robot relative to the road. The mobile robot can use a map and/or its localization features to localize itself or to find its relative position to the road. The relative position between the road and the mobile robot can be advantageous as it can allow the mobile robot to determine whether an obstacle in the surrounding occludes the vision of the mobile robot to the road. It can be understood that not all the objects detected on the surrounding of the mobile robot occlude the vision of the mobile robot to the road. Rather, only obstacles positioned between the mobile robot and the road can occlude vision of the mobile robot to part of the road. Thus, for a more accurate determination whether there are any occluding obstacles occluding the vision of the mobile robot to a road, it can be advantageous to determine the relative position between the mobile robot and the road.

In some embodiments, the determination whether there are any occluding obstacles occluding the vision of the mobile robot to a road can be facilitated by the relative position between the mobile robot, the road and the occluding obstacle. That is, the mobile robot can know its relative position to the road. For example, the mobile robot can use its localization features and/or a map to determine its relative position to the road. Furthermore, the mobile robot can be configured to detect objects positioned in the surroundings of the mobile robot, such as in all the directions or only in the directions towards the road to be crossed by the mobile robot. Further, the mobile robot can determine the position of the object relative to the mobile robot and/or to the road. The relative position of the object relative to the mobile robot can facilitate the determination whether such an object occludes vision of the mobile robot to the road or not. It can be understood that not all the objects detected on the surrounding of the mobile robot can occlude the vision of the mobile robot to the road. Rather, only obstacles positioned between the mobile robot and the road can occlude the vision of the mobile robot to part of the road. Thus, for a more accurate determination whether there are any occluding obstacles occluding the vision of the mobile robot to a road, it can be advantageous to determine the relative position between an obstacle, that can potentially occlude the vision of the mobile robot to the road, the mobile robot and the road to be crossed.

In some embodiments, a map can be used for determining the relative position between the mobile robot and the road. The map can be advantageous as it can facilitate the mobile robot's localization. Furthermore, the map can provide to the mobile robot information regarding the position of roads. Thus, the mobile robot using the map and/or its localization features can localize itself on the map and thus can calculate the relative position between itself and the road. Furthermore, using the map to determine the relative position between the mobile robot and the road can be efficient, as usually the mobile robot can have access to the map for the purpose of localization and the same map (and/or localization process) can be used to also determine the relative position between the road and the mobile robot.

In some embodiments, the method can comprise the mobile robot localizing itself. Thus, the mobile robot can determine its own position. The mobile robot's position can be advantageous as the mobile robot can further infer the relative position between the robot and the road and/or an occluding obstacle. Furthermore, being able to localize itself can facilitate the mobile robot navigation and autonomous driving. In some embodiments, the mobile robot may localize itself by means of a localization algorithm described in WO 2017/076929 A1.

In some embodiments, the determination whether there are any occluding obstacles occluding the vision of the mobile robot to the road can be facilitated by an image of the surrounding of the mobile robot. For example, the mobile robot can take images of the surroundings and can identify shape patterns on such images that can be similar with potential occluding obstacles such as parked vehicles, trees, traffic signs, traffic participants and/or buildings. The pattern recognition may be facilitated by neural network algorithms. Thus, using images of the surrounding, the mobile robot can determine the presence (or absence) and/or the position on the image of a potential occluding obstacle. For example, images can be taken only in the direction towards the road, and if obstacles are detected on such images the mobile robot can infer the presence of occluding obstacles that occlude robot's vision to the road. In another example, the mobile robot can take images on different directions, such as all the directions, and based on a known relative position between the mobile robot and the road, the mobile robot can infer which of the obstacles that can be detected on the captured images can obstruct mobile robot's view to the road.

In some embodiments, the determination whether there are any occluding obstacles blocking the vision of the mobile robot to the road can be facilitated by any of the detection and localization of the road on the image. That is, the mobile robot can capture an image of the surrounding. Furthermore, the mobile robot can detect the presence and/or detection of the road on the image. For example, the mobile robot can search for shape patterns on the image similar to the shape of a road (e.g. two parallel lines). Upon detection of the road on the image, the mobile robot can determine if there are any obstacles that obstruct its view to the road. For example, the mobile robot can detect that the two lines (or the shapes that represent the road) are not continuous (e.g. they are interrupted at some point and resume at a distant point), it can infer that part of the view of the mobile robot to the road is obstructed. Thus, detecting the presence and/or position of a road on the image can be advantageous as it can provide hints to the mobile robot whether the view of the robot to the road can be obstructed. Such a detection can also be advantageous as it can facilitate the localization of the mobile robot. Said detection can also allow the mobile robot to determine a relative position of the mobile robot to the road.

In some embodiments, the determination whether there are any occluding obstacles occluding the vision of the mobile robot to the road can be facilitated by any of the detection and localization of the obstacle on the image. That is, the mobile robot can capture an image of the surrounding. Furthermore, the mobile robot can detect the presence (or absence) and/or position of an obstacle on the image. For example, the mobile robot can search for shape patterns on the image that can belong to occluding obstacles such as parked vehicles, trees, traffic signs, buildings or traffic participants. The detection of the obstacles on the images can be facilitated by neural networks algorithm. Taking images of the surrounding and detecting obstacles on the images can be advantageous as it can provide an efficient manner for detecting if there can be any obstacle that can occlude the mobile robot's vision to the road. Furthermore, the detection of the obstacle on the image and the position of the obstacle on the image can allow the mobile robot to infer the relative position between the obstacle and the mobile robot. Thus, the mobile robot can determine if the obstacle occludes the mobile robot's vision to the road or not.

In some embodiments, stereo cameras can be used for detecting occluding obstacles occluding the vision of the mobile robot to the road.

In some embodiments, time-of-flight (TOF) cameras can be used for detecting occluding obstacles occluding the vision of the mobile robot to the road.

In some embodiments, ultrasonic cameras can be used for detecting occluding obstacles occluding the vision of the mobile robot to the road.

That is, a variety of sensors, such as stereo cameras, TOF cameras and/or ultrasonic cameras, can be used for detecting occluding obstacles that occlude the vision of the mobile robot to the road. The use of said sensors (alone or in combination with each-other) can provide more accurate information regarding the presence of an obstacle and the position of the obstacle relative to the mobile robot (or the respective sensors). Thus, the use of said sensors can facilitate the determination of whether there are any occluding obstacles that can occlude the vision of the mobile robot to the road.

In some embodiments, all the directions can be searched for detecting occluding obstacles occluding the vision of the mobile robot to the road.

In some embodiments, only the directions towards roads surrounding the mobile robot can be searched for detecting occluding obstacles occluding the vision of the mobile robot to the road. That is, the mobile robot can "know" the directions towards the road, e.g. the mobile robot comprises information regarding the relative position of the mobile robot to the road. Based on the rationale that the view of the mobile robot to the road can only be obstructed by obstacles positioned between the mobile robot and the road, it can be efficient that only the directions toward the road are searched for detecting occluding obstacles. This may result in a faster determination of whether the view of the mobile robot to the road is obstructed.

In some embodiments, the determination whether there are any occluding obstacles occluding the vision of the mobile robot to a road can be facilitated by the size of the obstacle. That is, a threshold can be defined that indicates the maximum size of an obstacle that can be tolerated (i.e. that can allow the mobile robot to gain the true state of the road even if the obstacle is present). For example, thin objects, such as sign posts, can obstruct only a small part of the road and can allow the mobile robot to "see" the road. The mobile robot can for example detect a car moving on the road even if a sign post is positioned between the mobile robot and the road. However larger obstacles such as cars parked on the roadside or group of people walking on the roadside or sidewalk, may block a relatively big part of the road and may not allow the mobile robot to detect the true state of the road, e.g. a car driving on the road. Thus, it can be advantageous to determine, among others, the size of the obstacle.

In some embodiments, the road crossing can be determined as operator-based road crossing if it is determined that there exist occluding obstacles occluding the vision of the mobile robot to the road and the size of the occluding obstacle exceeds a certain threshold. That is, if an obstacle exceeding a certain threshold value can be present, it may not allow the mobile robot to "see" part of the road. Thus, it may not be completely safe for the mobile robot to cross the road automatically and autonomously. As a result, it may be advantageous for safety reasons, to perform an operator-based road crossing when there are occluding obstacles occluding the vision of the mobile robot to the road and the size of the occluding obstacle exceeds a certain threshold.

In a second embodiment, a method for operating a mobile robot is disclosed. The method comprises the mobile robot travelling on a pedestrian pathway. The mobile robot then captures images with at least one depth sensor. The method also comprises identifying objects in the depth sensor images. The captured images are then compared with stored map data to identify at least one predetermined road. The method further comprises detecting occlusion by at least one identified object on a path of the mobile robot between the mobile robot and the predetermined road.

Identifying objects in the depth sensor images can refer herein to both identifying arbitrary objects of a certain minimum size and general shape, as well as identifying a specific type of object, such as a tree.

The present method may be a quicker and more streamlined way of detecting occlusion as compared to the first embodiment. The sensor used is a depth sensor, which can preferably comprise one or more stereo cameras (and/or a Lidar sensor, a time of flight (ToF) sensor). Detecting occlusion may comprise detecting a sufficiently large object present between the mobile robot and the road (identified based on stored map data). Using a sensor recording depth or distance data can allow to quickly gauge whether large objects are present in the immediate vicinity of the mobile robot, and in such a way that they may be obscuring part of the road.

The present method for detecting occlusion may be quicker to process than the previously described one. Therefore, the present method can be used in situations where a quicker occlusion detection may be advantageous. For example, the present method can be advantageously used when a mobile robot is travelling on a sidewalk, and is approaching a driveway. It may be useful to quickly verify whether a moving vehicle is present on the driveway, which may be a simpler task than looking for moving vehicles when crossing a traffic road (where vehicles can come from multiple directions and generally move with much greater speeds).

The sensors used in this method can preferably comprise at least one stereo camera and/or at least one ToF sensor. The mobile robot can preferably comprise both one or more stereo cameras and one or more ToF sensors. In this case, the mobile robot may switch between using the sensors depending on different conditions (such as light conditions, weather, time of day and so on), and/or use both sensors together for a more reliable occlusion detection.

The robot may also use the two sensors (stereo camera and ToF sensor) for occlusion detection successively. That is, the robot may first use a ToF sensor for occlusion detection (for example, at a distance of 10 to 15 meters from a driveway) followed by using a stereo camera for occlusion detection (for example, at a distance of 5 to 10 meters from a driveway). This may be advantageous if the ToF sensor and stereo cameras have different accuracy ranges, with one being more accurate at larger distances than the other. In this way, the mobile robot can approach a driveway without significantly slowing down if occlusion was not detected and also no moving vehicles were detected.

The present method relying on a sensor with a depth measurement can be particularly useful for detecting occlusions that may be located at distances of 5 to 15 or 20 meters away from the mobile robot. The previously described first embodiment, on the contrary, can be advantageously used to detect occlusions at distances up to 100 meters or even more. Therefore, the method of the first embodiment can be particularly useful for the mobile robot when attempting to cross a busy traffic road, where vehicles may come from a plurality of directions and at high speeds. The present second embodiment, however, can be particularly useful for shorter scales and slower moving vehicles. That is, the mobile robot may be travelling on a sidewalk and about to cross a driveway, at which point it can be important to detect whether any part of the driveway may be occluded, so that a moving vehicle may be concealed.

In some such embodiments, the method can further comprise classifying the detected occlusion. That is, the object may also be identified (either via the data from the depth sensor or other sensor data).

In some such embodiments, the method can further comprise the mobile robot taking an action depending on said classifying. The action can comprise at least one of ceasing traveling, traveling a specified distance in a specified direction and contacting a remote operator. As described with regard to the first embodiment, such actions can generally serve to increase operational efficiency and safety of the mobile robot.

In some such embodiments, the predetermined road can comprise a driveway and the identified object can occlude at least a part of the driveway. That is, the present method can be particularly useful when attempting to cross driveways. Driveways generally have less traffic than other roads, and therefore it may be useful to have a specific method of occlusion detection for them. Furthermore, the type of occlusion encountered when crossing a driveway and another road can be different. The present embodiment allows to streamline the process while maintaining high safety standards.

In some such embodiments, the method can further comprise the mobile robot aborting crossing the driveway upon detection of the occlusion by the identified object. Furthermore, a method for detecting occlusion such as that described in a first embodiment can then be used to further confirm the presence of true occlusion.

In some such embodiments the steps of identifying objects, comparing captured images with stored map data and detecting occlusion are performed by the mobile robot. In other words, the entire process starting from capturing images and culminating in an output of detected occlusion (or no occlusion detected) can be executed on the mobile robot's processing component without any computations or subroutines being performed remotely. This can be particularly advantageous, as it may allow to significantly reduce the total time necessary to perform an occlusion detection. In other words, if some computations are performed on a remote server, the time for sending the data from the robot to the server and a result of the computation back to the robot may add additional time to the overall occlusion detection algorithm. Streamlining the process to have it run entirely on the mobile robot can allow to significantly reduce the overall run time of the occlusion detection algorithm, thereby ensuring that occlusion can be detected without significant delay to the mobile robot's operations. For example, a robot may run the occlusion detector as it is travelling on a sidewalk and approaching a driveway, without having to stop before crossing it (unless a moving vehicle or occlusion is detected).

In a third embodiment, a system for operating a mobile robot is disclosed. The system comprises a mobile robot configured to travel in outdoor settings. The mobile robot comprises at least one first sensor configured to capture data related to the outdoor settings and at least one processing component. The processing component is configured to process data captured by the at least one first sensor to identify areas of interest corresponding to at least one section of the outdoor setting, and identify occlusion present in the preprocessed data.

In some embodiments, the system can further comprise a memory component configured to store map data indicative of the outdoor settings. This stored map data can be as described above with regard to the first embodiment. The processing component can be further configured to compare preprocessed data with the stored map data.

In some such embodiments, the first sensor can comprise a visual camera. The sensor can also comprise a plurality of cameras. The first sensor can further comprise at least one stereo camera.

In some embodiments, the system can further comprise a remote operator terminal. The remote operator terminal is configured to assume control of the mobile robot when contacted upon detecting an occlusion exceeding a certain predetermined threshold. As also described above, the remote operator terminal can advantageously allow to further evaluate the occlusion and remotely assume control of the mobile robot. This can generally contribute to the safety and reliability of mobile robot operations.

Below, a description of the mobile robot's autonomy capabilities follows.

The mobile robot can be an autonomous or a semi-autonomous robot configured for ground-based travel. Note, that as used herein, the terms autonomous or semi-autonomous robot can be used to mean any level of automation depending on the task that the robot is performing. That is, the robot can be adapted to function autonomously or semi-autonomously for most of the tasks, but can also be remotely controlled for some other tasks. Then, the robot would be non-autonomous during the time it is controlled, and then autonomous and/or semi-autonomous again when it is no longer controlled. For example, the robot can assume any of the levels of automation as defined by the Society of Automotive Engineers (SAE), that is, the levels as given below.

Level 0—No Automation
Level 1—Driver Assistance
Level 2—Partial Automation
Level 3—Conditional Automation
Level 4—High Automation
Level 5—Full Automation Though the levels usually refer to vehicles such as cars, they can also be used in the context of the mobile robot. That is, Level 0 can correspond to a remote terminal fully controlling the robot. Levels 1-4 can correspond to the remote terminal partially controlling the robot, that is, monitoring the robot, stopping the robot or otherwise assisting the robot with the motion. Level 5 can correspond to the robot driving autonomously without being controlled by a remote terminal such as a server or a remote operator (in this case, the robot can still be in communication with the remote terminal and receive instructions at regular intervals).

The present invention is also defined by the following numbered embodiments.

Below is a list of method embodiments. Those will be indicated with a letter "M". Whenever such embodiments are referred to, this will be done by referring to "M" embodiments.

M1. A method for operating a mobile robot, the method comprising
  Traveling in an outdoor setting; and
  Capturing data related to the outdoor setting via at least one first sensor; and
  Processing captured data to identify areas of interest corresponding to at least one segment of the outdoor setting; and
  Identifying occlusion present in the preprocessed data.

M2. The method according to the preceding embodiment further comprising comparing preprocessed data with stored map data indicative of the segment of the outdoor setting to identify occlusion present in the preprocessed data.

M3. The method according to the preceding embodiment wherein preprocessing captured data further comprises discarding a predetermined part of the captured data.

M4. The method according to any of the preceding embodiments wherein processing captured data comprises segmenting it.

M5. The method according to the preceding embodiment wherein segmenting comprises dividing captured data into a plurality of different area types.

M6. The method according to the preceding embodiment wherein one area type comprises traffic roads.

M7. The method according to any of the preceding embodiments and with the features of embodiment M2 wherein stored map data comprises traffic road data.

M8. The method according to the preceding embodiment wherein stored map data further comprises average traffic density for each road.

M9. The method according to any of the two preceding embodiments wherein stored map data further comprises road difficulty parameter for each road.

M10. The method according to any of the preceding embodiments and with the features of embodiment M2 wherein stored map data further comprises infinity points.

M11. The method according to any of the preceding embodiments and with the features of embodiment M2 wherein comparing preprocessed data with stored map data comprises projecting stored map data onto coordinates of the preprocessed data.

M12. The method according to the two preceding embodiments wherein comparing preprocessed data with stored map data further comprises identifying position of infinity points in the preprocessed data.

M13. The method according to any of the preceding embodiments and with the features of embodiments M2 and M9 wherein comparing preprocessed data with stored map data further comprises identifying traffic roads with the road difficulty parameter exceeding a particular threshold in the preprocessed data.

M14. The method according to any of the preceding embodiments further comprising assigning an occlusion score to each potential detected occlusion.

M15. The method according to the preceding embodiment further comprising comparing the occlusion score with a predetermined occlusion threshold and keeping occlusions with a score above the threshold.

M16. The method according to any of the preceding embodiments wherein identifying occlusion comprises running a neural network-based algorithm on a combination of the preprocessed data and stored map data.

M17. The method according to the preceding embodiment and with features of embodiment M15 wherein the neural network-based algorithm is run on the occlusions with the occlusion score above the predetermined occlusion threshold.

M18. The method according to any of the preceding embodiments further comprising computing a distance range between the mobile robot and the identified occlusion.

M19. The method according to the preceding embodiment further comprising discarding the occlusion if a minimum possible distance between the mobile robot and the identified occlusion is above a predetermined threshold.

M20. The method according to any of the preceding embodiments wherein identifying occlusion comprises identifying at least one occluding object.

M21. The method according to any of the preceding embodiments further comprising identifying a type of occlusion present in the preprocessed data.

M22. The method according to the preceding embodiment wherein the type of occlusion comprises at least one of
 Vegetation;
 Vehicle;
 Pole;
 Waste container;
 Mailbox; and
 Unidentified object.

M23. The method according to any of the two preceding embodiments further comprising executing an action, wherein said action is selected based on the type of occlusion.

M24. The method according to the preceding embodiment wherein the action comprises at least one of
 Ceasing traveling;
 Traveling a specified distance in a specified direction; and
 Contacting a remote operator.

M25. The method according to any of the preceding embodiments further comprising contacting a remote operator terminal in case identified occlusion exceeds a predetermined parameter.

M26. The method according to the preceding embodiment further comprising the remote operator terminal assuming control of the mobile robot after being contacted.

M27. The method according to any of the preceding embodiments and with the features of embodiment M4 further comprising identifying objects in the captured data and segmenting the captured data simultaneously.

M28. The method according to any of the preceding embodiments wherein the first sensor comprises at least one of a visual camera and a time of flight (ToF) sensor and the captured data comprises a plurality of frames captured by the first sensor.

M29. The method according to the preceding embodiment wherein processing captured data comprises detecting vehicles in the frames captured by the first sensor.

M30. The method according to the preceding embodiment further comprising identifying parked vehicles among the detected vehicles and wherein the vehicles are detected by the mobile robot by using a neural network-based detector.

M31. The method according to the preceding embodiment wherein identifying occlusion comprises evaluating parked vehicles' placement on a road.

M32. The method according to the preceding embodiment wherein identifying occlusion further comprises detecting at least one identified parked vehicle that occludes at least a part of the road where moving vehicles may be present.

M33. A method for operating a mobile robot, the method comprising
 The mobile robot traveling on a pedestrian pathway; and
 The mobile robot capturing images with at least one depth sensor; and
 Identifying objects in the depth sensor images; and
 Comparing captured images with stored map data to identify at least one predetermined road; and
 Detecting occlusion by at least one identified object on a path of the mobile robot between the mobile robot and the predetermined road.

M34. The method according to the preceding embodiment further comprising classifying the detected occlusion.

M35. The method according to the preceding embodiment further comprising the mobile robot taking an action depending on said classifying.

M36. The method according to the preceding embodiment wherein the action comprises at least one of
 Ceasing traveling;
 Traveling a specified distance in a specified direction; and Contacting a remote operator.

M37. The method according to any of the four preceding embodiments wherein the predetermined road comprises a driveway and wherein the identified object occludes at least a part of the driveway.

M38. The method according to the preceding embodiment further comprising
the mobile robot aborting crossing the driveway upon detection of the occlusion by the identified object.

M39. The method according to any of the preceding embodiments M32 to M38 wherein the steps of identifying objects, comparing captured images with stored map data and detecting occlusion are performed by the mobile robot.

M40. A method comprising:
a data processing device determining whether a mobile robot road crossing is performed automatically and autonomously by the mobile robot or operator-based.

M41. A method according to the preceding method embodiment, wherein the method further comprises determining whether there are any occluding obstacles occluding the vision of the mobile robot to the road.

M42. A method according to the preceding embodiment, wherein the determination whether there are any occluding obstacles occluding the vision of the mobile robot to a road is facilitated by the determination of the position of the mobile robot relative to the road.

M43. A method according to any of the preceding method embodiments M40 to M42 and with the features of embodiment M41, wherein the determination whether there are any occluding obstacles occluding the vision of the mobile robot to a road is facilitated by the relative position between the mobile robot, the road and the occluding obstacle.

M44. A method according to any of the preceding method embodiments M40 to M43 and with the features of embodiment M41, wherein a map is used for determining the relative position between the mobile robot and the road.

M45. A method according to any of the three preceding method embodiments, wherein the method comprises the mobile robot localizing itself.

M46. A method according to any of the preceding method embodiments M40 to M45 and with the features of embodiment M41, wherein the determination whether there are any occluding obstacles occluding the vision of the mobile robot to the road is facilitated by an image of the surrounding of the mobile robot.

M47. A method according to the preceding embodiment, wherein the determination whether there are any occluding obstacles occluding the vision of the mobile robot to the road is facilitated by any of the detection and localization of the road on the image.

M48. A method according to any of the preceding two embodiments, wherein the determination whether there are any occluding obstacles occluding the vision of the mobile robot to the road is facilitated by any of the detection and localization of the obstacle on the image.

M49. A method according to any of the preceding method embodiments M40 to M48 and with the features of embodiment M41, wherein stereo cameras are used for detecting occluding obstacles occluding the vision of the mobile robot to the road.

M50. A method according to any of the preceding method embodiments M40 to M49 and with the features of embodiment M41, wherein time-of-flight (TOF) cameras are used for detecting occluding obstacles occluding the vision of the mobile robot to the road.

M51. A method according to any of the preceding method embodiments M40 to M50 and with the features of embodiment M41, wherein ultrasonic cameras are used for detecting occluding obstacles occluding the vision of the mobile robot to the road.

M52. A method according to any of the preceding method embodiments M40 to M51 and with the features of embodiment M41, wherein all the directions are searched for detecting occluding obstacles occluding the vision of the mobile robot to the road.

M53. A method according to any of the embodiments M40 to M51 and with the features of embodiment M41, wherein only the directions towards roads surrounding the mobile robot are searched for detecting occluding obstacles occluding the vision of the mobile robot to the road.

M54. A method according to any of the preceding method embodiments M40 to M53 and with the features of embodiment M41, wherein the determination whether there are any occluding obstacles occluding the vision of the mobile robot to a road is facilitated by the determination of the size of the obstacle.

M55. A method according to any of the preceding method embodiments M40 to M54 and with the features of embodiment M41, wherein the road crossing is determined as operator-based road crossing if it is determined that there exist occluding obstacles occluding the vision of the mobile robot to the road and the size of the occluding obstacle exceeds a certain threshold.

M56. A method according to any of the preceding method embodiments M40 to M55, wherein a road crossing is determined as automatic and autonomous road crossing if a public road is classified as safe for automatic and autonomous road crossing and no occluding obstacles, such as cars parked on the roadside, obstruct the vision of the mobile robot to the road.

Below is a list of system embodiments. Those will be indicated with a letter "S". Whenever such embodiments are referred to, this will be done by referring to "S" embodiments.

S1. A system for operating a mobile robot comprising
A mobile robot configured to travel in outdoor settings and comprising at least one first sensor configured to capture data related to the outdoor settings; and
At least one processing component configured to
Process data captured by the at least one first sensor to identify areas of interest corresponding to at least one section of the outdoor setting; and
Identify occlusion present in the preprocessed data.

S2. The system according to the preceding embodiment further comprising a memory component configured to store map data indicative of the outdoor settings; and
wherein the processing component is further configured to compare preprocessed data with the stored map data.

S3. The system according to any of the two preceding embodiments wherein the first sensor comprises a visual camera.

S4. The system according to the preceding embodiment wherein the first sensor comprises at least one stereo camera.

S5. The system according to any of the preceding system embodiments further comprising a remote operator terminal.

S6. The system according to the preceding embodiment wherein the remote operator terminal is configured to assume control of the mobile robot when contacted upon detecting an occlusion exceeding a certain predetermined threshold.

S7. The system according to any of the preceding system embodiments configured to execute the method according to any of the preceding method embodiments.

The present technology will now be discussed with reference to the accompanying drawings.

BRIEF DESCRIPTION OF THE DRAWINGS

FIGS. 3a-3g depict stages of identifying occlusion in sensor data captured by a mobile robot;

DESCRIPTION OF EMBODIMENTS

Figure 1:
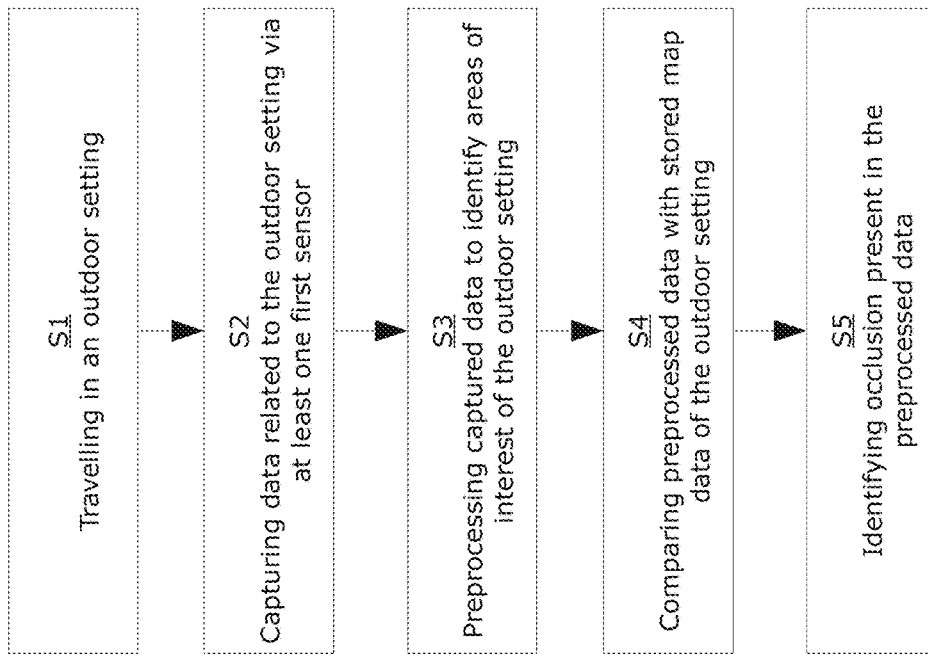
FIG. 1 depicts a schematic embodiment of a method for operating mobile robots according to an aspect of the present invention.

FIG. 1 schematically lists the steps of a method for operating a mobile robot according to an aspect of the present invention. In S1, a mobile robot is traveling in an outdoor setting. The outdoor setting can comprise, for example, sidewalks, pedestrian walkways, and other outdoor spaces/surroundings. The outdoor setting is meant to differentiate from generally structured and more predictable indoor settings. The outdoor setting generally refers to, in the present context, the immediate surroundings of the mobile robots which it can detect at a given time via its sensors. For example, outdoor setting may refer to a segment of a street and/or a plurality of streets that the robot can observe via images captured by cameras.

In S2, data related to the outdoor setting is captured. This is done via a first sensor of the mobile robot. The sensor can comprise a visual sensor, such as a visual camera and/or sensors such as a time of flight camera, lidar sensor, ultrasonic sensor, radar and/or a combination of sensors. The sensor can also comprise a plurality of sensors, such as a plurality of cameras facing towards different directions.

In S3, the captured data is preprocessed to identify areas of interest in the outdoor setting. The preprocessing can comprise filtering out areas that are deemed safe to ignore. The preprocessing can also additionally and/or alternatively comprise combining data captured by a plurality of sensors. For example, a panorama image can be stitched from a plurality of images captured by different cameras as part of preprocessing.

In S4, preprocessed data is compared with stored map data associated with the outdoor setting. In other words, a street map of an outdoor area or setting where the robot is located can be projected or layered over the data detected by the robot. This can be done by first identifying the robot's precise location, and then mapping the map data onto the coordinates associated with sensor data.

In S5, occlusion present in preprocessed data is identified. The occlusion can correspond to objects present between the mobile robot's sensors' line of sight and areas of interest. The areas of interest can generally correspond to traffic roads where vehicles moving with high speed may be present. The occlusion can be identified by a plurality of different image processing means. Generally and simply speaking, detection the occlusion may involve looking for elements present in map data (such as traffic roads), and, if they cannot be located (in appropriate locations based on projecting of the map data onto preprocessed data), identifying occlusion candidates. Further steps may be performed as well.

Simply put, the present method may advantageously allow to identify areas of a mobile robot's surroundings where potentially hazardous objects such as vehicles may be occluded (that is, partially or fully hidden or covered) via other (possibly stationary) objects. This can greatly increase safety and reliability of operations of a mobile robot traveling in outdoor settings, where fast-moving objects such as vehicles may be present.

Figure 2:
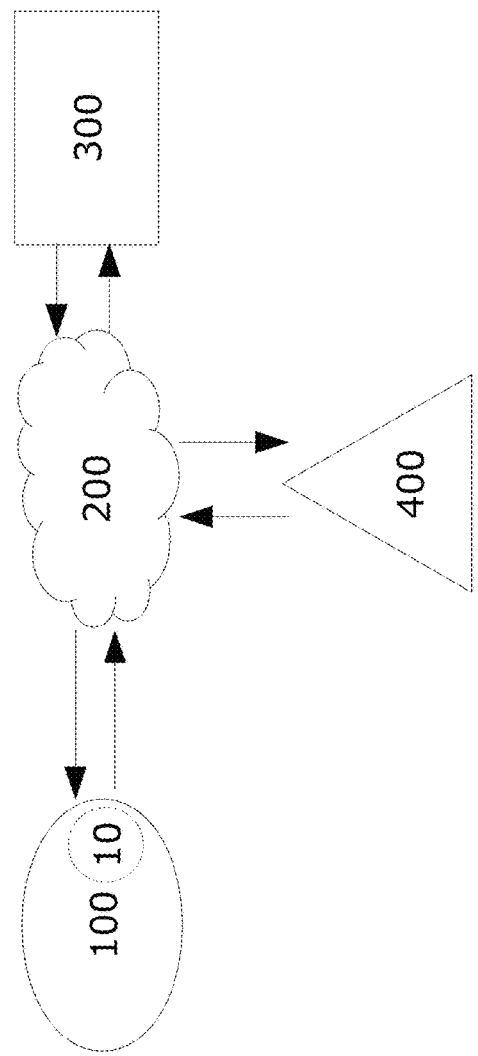
FIG. 2 schematically shows a system for operating mobile robots according to an aspect of the present invention.

FIG. 2 schematically depicts an embodiment of a system for operating a mobile robot according to an aspect of the present invention. Mobile robot 100 comprises at least one sensor 10. The mobile robot 100 is configured to communicate with a server 200. The server 200 may be configured to perform some or all of the steps for identifying occlusion in sensor data captured by the mobile robot's sensor 10.

A memory component 300 may be used to store map data associated with the outdoor surroundings where the mobile robot 100 is traveling. The memory component 300 may communicate with the server 200. Additionally or alternatively, some or all of the map data associated with the robot's surroundings may be stored on the mobile robot 100. This may be done, for example, by preloading a relevant outdoor area or neighborhood from the memory component 300 onto the mobile robot 100 via the server 200 and/or directly. In other words, a separate memory component 300 is optional to the present embodiment of the system for operating a mobile robot.

FIG. 2 also depicts an optional operator terminal 400. The operator terminal 400 may be alerted if occlusion is detected in mobile robot's surroundings. In other words, if there is a possibility that vehicles in the vicinity of the mobile robot 100 are occluded by other objects, the operator terminal 400 may be notified, so that an operator can verify whether any hazardous situation can occur. Additionally or alternatively, the operator terminal 400 may be consulted if a final judgment regarding possible occlusion needs to be taken.

FIGS. 3a to 3g depict different stages of identifying occlusion in sensor data of a mobile robot traveling in an outdoor setting.

Figure 3A:
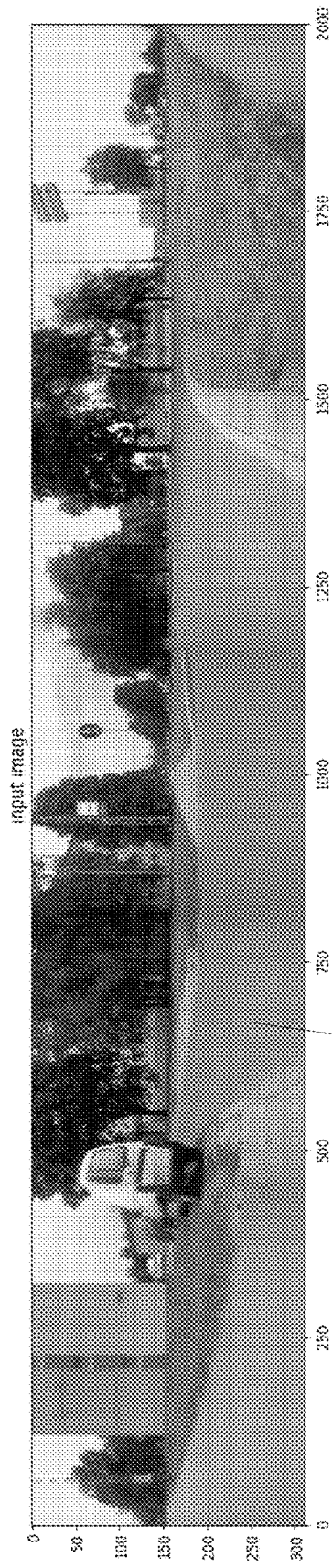

FIG. 3a shows a combination of images captured by a plurality of visual images. The images are combined into a panorama frame to allow quicker processing and a full overview of a mobile robot's surroundings. This is optional, as each image can also be processed individually. The original individual images and/or the combined panorama image can correspond to sensor data, in this exemplary case images taken via visual cameras.

Figure 3B:
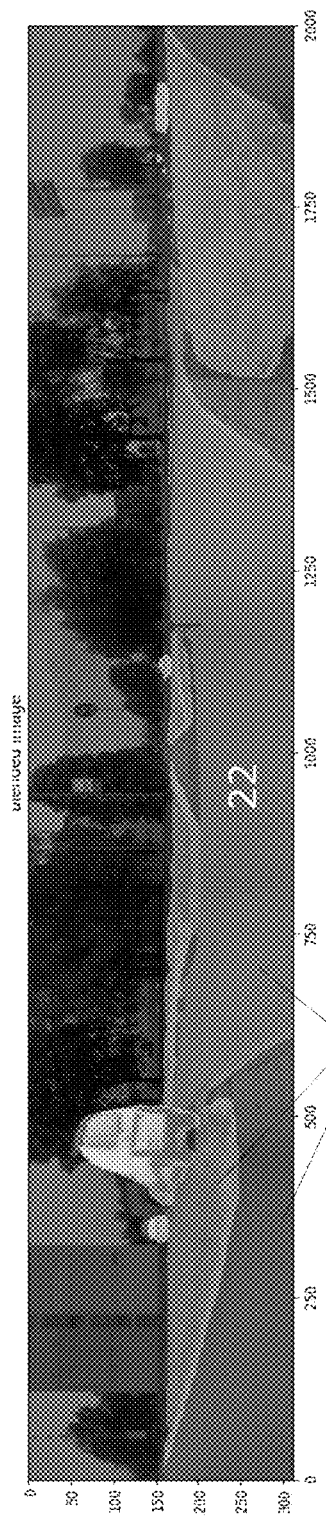
Figure 3C:
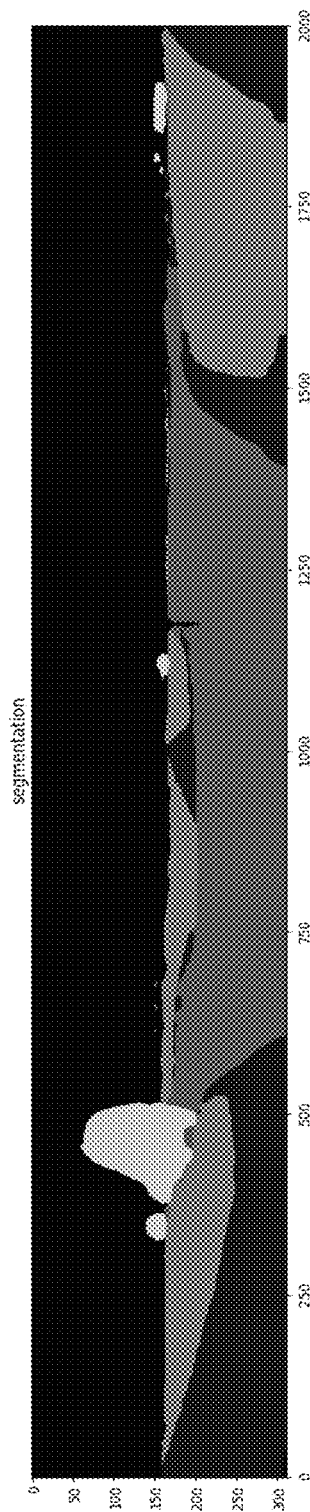

FIG. 3b shows a blended image comprised of the panorama frame from FIG. 3b superimposed with itself after being segmented. FIG. 3c shows the segmented image on its own, without the original panorama frame. The segmentation can correspond to preprocessing of the captured data. The segmentation can comprise dividing sensor data into segments or regions according to certain parameters. In the present exemplary case, the image is segmented or divided into a plurality of regions or segments 20 according to class of an object/area present in it. In other words, the segments 20 correspond to either objects or details of the surroundings visible in the image. In the present example, the classes comprise road, greenery, sidewalk, person, vehicle, bicycle and other. Other classes and/or further subclasses can also be used. Segment 22 corresponds to a traffic road.

Figure 3D:
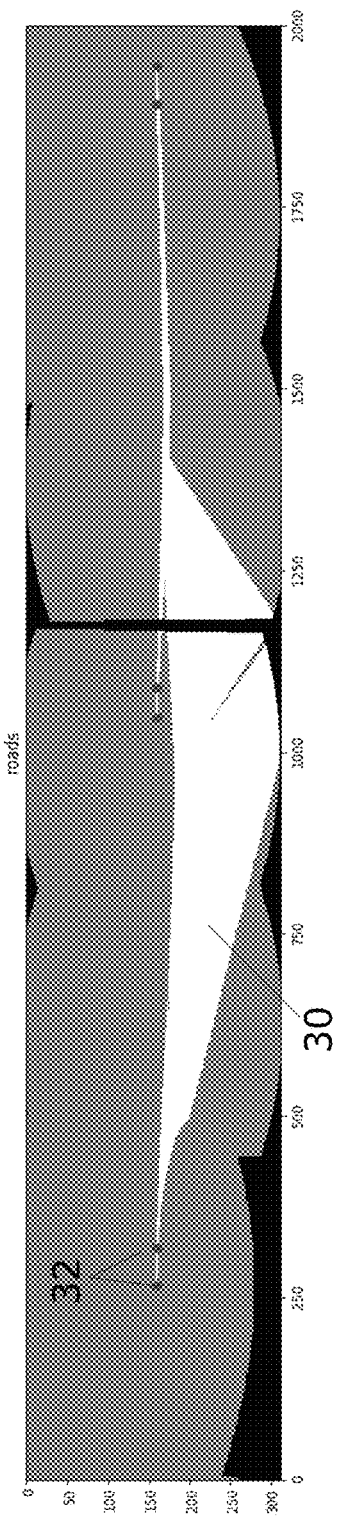

It can be particularly useful to focus on the segmentation class corresponding to roads, preferably traffic roads. This is because objects present on those can be particularly relevant to safe and efficient operations of mobile robots traveling outdoors. Specifically, cars covered by parked cars or by trees can be moving very fast towards the mobile robot. In accordance with that, FIG. 3d depicts map data 30 corresponding to the image data. In other words, FIG. 3d shows map data corresponding to a traffic road 22 that has been projected onto coordinates associated with the image. Comparing FIGS. 3d and 3c, the segment corresponding to road (or traffic road) 22 can be seen in FIG. 3c directly above the corresponding white area 30 of FIG. 3d.

FIG. 3d also shows infinity points 32 (shown in bold at the edges of the white space corresponding to the location and topology of a traffic road). The infinity points 32 can also be particularly important for detecting obfuscation which may be relevant to a mobile robot crossing a traffic road. If one or more of the infinity points cannot be identified in the detected image (that is, captured data), it can be the case that these are obfuscated or covered by an obstacle. Since the infinity points 32 generally correspond to the horizon, or the furthest visible stretch of traffic road 22, if one or more of them is obstructed or obfuscated, the mobile robot may not detect a fast-moving vehicle approaching from some distance away.

The traffic road map data 30 shown in FIG. 3d may also comprise further parameters associated with it. For instance, average traffic density may be associated with each map data of a traffic road. Additionally or alternatively, a classification of the road's danger and/or difficulty level may also be associated with the traffic road map data 30. This can be based on the traffic density, number of lanes, previous mobile robot experience with the road crossing and other parameters.

FIG. 3e shows a visualisation of detecting occlusion in the images captured by the mobile robot. The segment corresponding to the traffic road 22 is compared with stored map data 30 corresponding to the traffic road, and areas where possible occlusion or obfuscation is present are identified. These areas are then shown, representing the "difference" between FIGS. 3c and 3d. A top third of the detected image can generally be disregarded for the purposes of obfuscation detection related to traffic roads. This is due to the orientation of the sensors (here cameras) of the mobile robot. The computation can thus be accelerated and streamlined. A skilled person will note that this is optional, and the whole image can be analysed without disregarding any part of it. Additionally or alternatively, a smaller or larger proportion of the image can be disregarded depending on the placement of the sensors and the field of view they capture. Further, the proportion of the image which may be disregarded can be adjusted based on the particular image, for example, by a certain comparison with map data and/or knowledge of traffic distribution on the specific traffic roads.

FIG. 3f graphically shows an occlusion score assigned to possible occlusions detected in FIG. 3e. The score can be assigned by an algorithm, such as a neural network based algorithm. The neural network may first be trained on images where a certain type of occlusion (such as occlusion of a traffic road via parked cars, vegetation etc) is annotated, and then applied to the images detected by the mobile robot. Occlusion threshold 40 can be a parameter selected based on the training of the neural network and may correspond to a high probability than an occlusion is present in the data from the robot's sensors.

A further optional step may be applied after identifying occlusions with a corresponding score. Occlusions above the occlusion threshold 40 may be subjected to a further classifier algorithm. This can comprise a separate additional convolutional neural network based on annotations of occlusions. This second step may comprise much more detailed and precise verification, and therefore be computationally more taxing. Therefore, it can be advantageous to only run it as an optional second step on already pre-identified occlusions, as opposed to directly on the whole image. An output of this step may comprise a set of occlusions with a probability assigned to them. The probability then corresponds to the likelihood of them being true occlusions and can be more accurate than the occlusion score shown in the FIG. 3f.

FIG. 3g shows the detected image with likely occlusion 50 highlighted (corresponding to a parked car, which may be occluding a moving vehicle).

FIGS. 4a and 4b depict an embodiment of occlusion detection according to the present invention. The figures show an exemplary image taken by a mobile robot's camera. The figures show an outdoor scene including vegetation, roads and buildings. Traffic road 12 is shown in both figures. Occluding objects 52 are identified by the boxes.

In FIG. 4a, the occluding object 52 corresponds to a tree, and in FIG. 4b to a bush. Both objects are occluding or covering part of the traffic road 12, thereby making it possible that moving vehicles are hidden from the mobile robot's sensors such as cameras. This can make it dangerous for the mobile robot to cross the road that is partially occluded. Additionally or alternatively, the occluded road may be perpendicular to the one that the mobile robot is about to cross, and oncoming turning vehicles may then be hidden.

The occluding objects 52 can be detected by using road maps, stereo cameras and an object detection algorithm. Additionally or alternatively, time of flight sensor may be used to survey the surroundings of the mobile robot and to capture a plurality of frames corresponding to those surroundings. The stereo cameras allow the distance to the detected objects to be computed. By using the map of the surroundings showing roads, the mobile robot can know their geometry. These two observations can then be combined to detect whether any significantly big objects have been detected between the mobile robot and the road. Such objects would generally be stationary, since moving objects would quickly move out of the frame.

FIGS. 4a and 4b show a plurality of rectangles indicating the occluding objects 52. The rectangles indicate the minimum size of the object that would indicate occlusion of the road. In other words, if an object at least the size of one rectangle is detected, this may indicate occlusion. Both FIGS. 4a and 4b show multiple rectangles combined together, reflecting that the detected occluding objects 52 are significantly larger than the selected threshold to identify occlusion. The threshold may be predetermined based on past data on occlusion and may be different depending on the distance between the mobile robot and the traffic road.

The method of identifying occluding objects illustrated in FIGS. 4a and 4b can be complimentary to the method based on processing image data and preferably segmenting it as shown in FIGS. 3a to 3g. The method of FIG. 3ff can be more versatile and reliable, and does not require a sensor measuring distance to the objects. Further, detecting the objects is not strictly necessary for that method, as a segmentation of the image into different area types can be sufficient. The method of FIGS. 4a and 4b can, on the other hand be quicker and more efficient to run. Both can be run in a complimentary fashion, or deployed in different circumstances. For example, the method of FIGS. 4a and 4b can be particularly suitable for detecting occluding objects when approaching driveways. Generally, there may be more occluding objects such as bushes, trees, garbage bins, mailboxes and similar when attempting to cross a driveway than a traffic road. Therefore, it may be useful to detect the occluding objects 52 quickly and efficiently before attempting to cross a driveway where a car might be pulling out. Furthermore, the method of FIGS. 4a and 4b may be particularly suitable for detecting occluding objects relatively close by to the mobile robot, such as 5, 10 or 15 meters. This can be sufficient when determining whether a driveway is safe to cross, since a car is not likely to be moving very fast and coming from very far away when on the driveway. However, when crossing a traffic road, it may be particularly important to also detect occlusions present far away from the mobile robot, such as at a distance of 20, 30, 40, 50, 60, or even 100 meters. This is due to much higher average speeds on a traffic road as compared to the driveway. A car occluded by another object at a distance of 100 meters from the mobile robot may be moving very fast, and may arrive to the location of the mobile robot within a few seconds.

Figure 5:
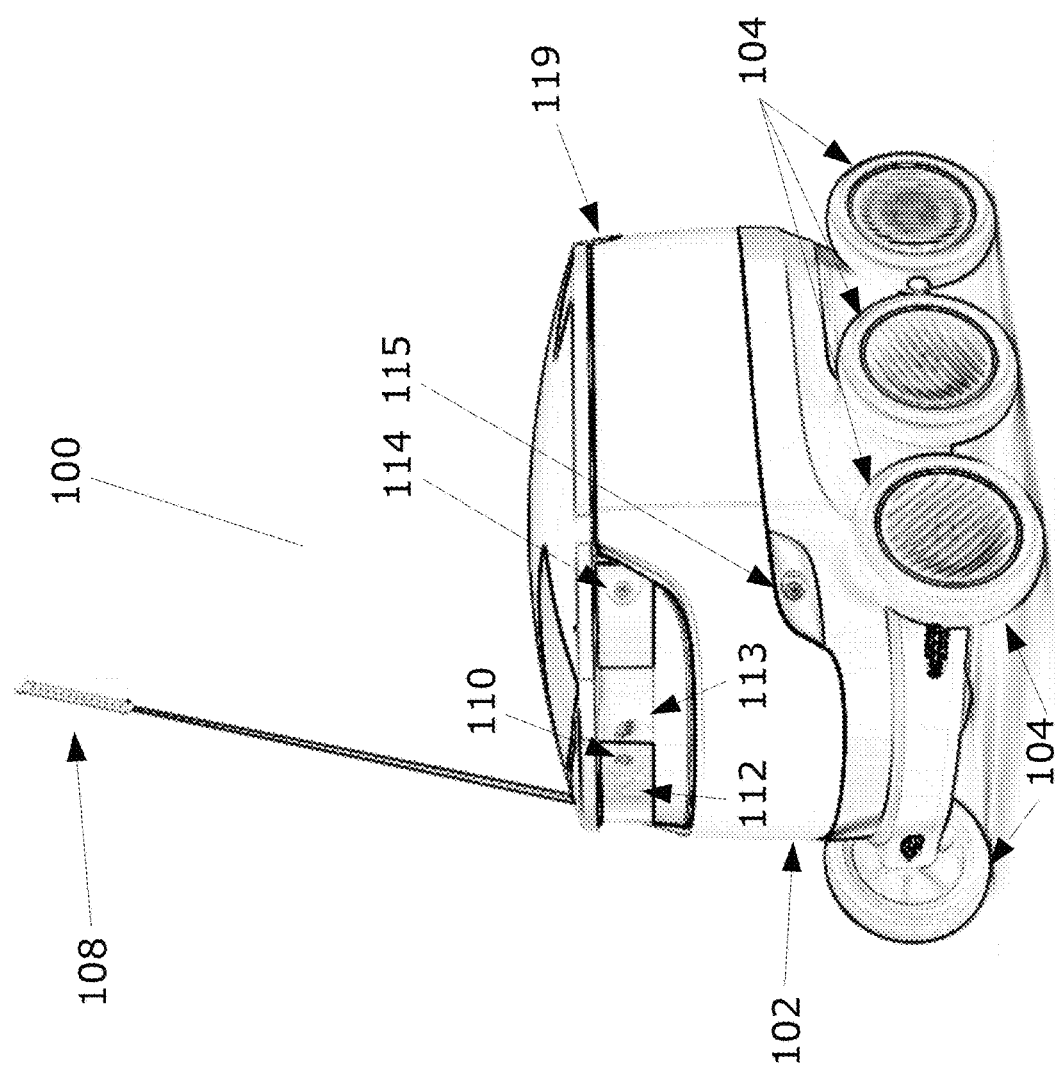
FIG. 5 shows an embodiment of a mobile robot as per an aspect of the present invention.

FIG. 5 demonstrates an exemplary embodiment of the mobile robot 100. The mobile robot 100 can comprise a delivery or a vending robot, that is, it can transport and deliver packages, consumable items, groceries or other items to customers. Preferably, the mobile robot 100 is outfitted with a beverage module (not shown in the figure).

The mobile robot 100 comprises a robot body 102. The body 102 comprises an item compartment in which items can be placed and transported by the robot (not shown in the present figure).

The mobile robot 100 further comprises a motion component 104 (depicted as wheels 104). In the present embodiment, the motion component 104 comprises six wheels 104. This can be particularly advantageous for the mobile robot 100 when traversing curbstones or other similar obstacles on the way to delivery recipients.

The mobile robot 100 comprises a lid 106. The lid 106 can be placed over the item compartment and locked to prevent unauthorized access to the beverage module.

The mobile robot 100 further comprises a robot signaling device 108, depicted here as a flagpole or stick 108 used to increase the visibility of the robot 100. Particularly, the visibility of the robot 100 during road crossings can be increased. In some embodiments, the signaling device 108 can comprise an antenna. The mobile robot 100 further comprises robot headlights 109 configured to facilitate the robot's navigation in reduced natural light scenarios and/or increase the robot's visibility further. The headlights are schematically depicted as two symmetric lights 109, but can comprise one light, a plurality of lights arranged differently and other similar arrangements.

The mobile robot 100 also comprises robot sensors 110, 112, 113, 114, 115, and 119. The sensors are depicted as visual cameras in the figure, but can also comprise radar sensors, ultrasonic sensors, lidar sensors, time of flight cameras and/or other sensors. Further sensors can also be present on the mobile robot 100. One sensor can comprise a front camera 110. The front camera 110 can be generally forward facing. The sensors may also comprise front, side and/or back stereo cameras 112, 113, 114, 115, 119. The front stereo cameras 112 and 113 can be slightly downward facing. The side stereo cameras 114 and 115 can be forward-sideways facing. There can be analogous side stereo cameras on the other side of the robot (not shown in the figure). The back stereo camera 119 can be generally backward facing. The sensors present on multiple sides of the robot can contribute to its situational awareness. That is, the robot 100 can be configured to detect approaching objects and/or hazardous moving objects from a plurality of sides and act accordingly.

The robot sensors can also allow the robot 100 to navigate and travel to its destinations at least partially autonomously. That is, the robot can be configured to map its surroundings, localize itself on such a map and navigate towards different destinations using in part the input received from the multiple sensors.

Figure 6:
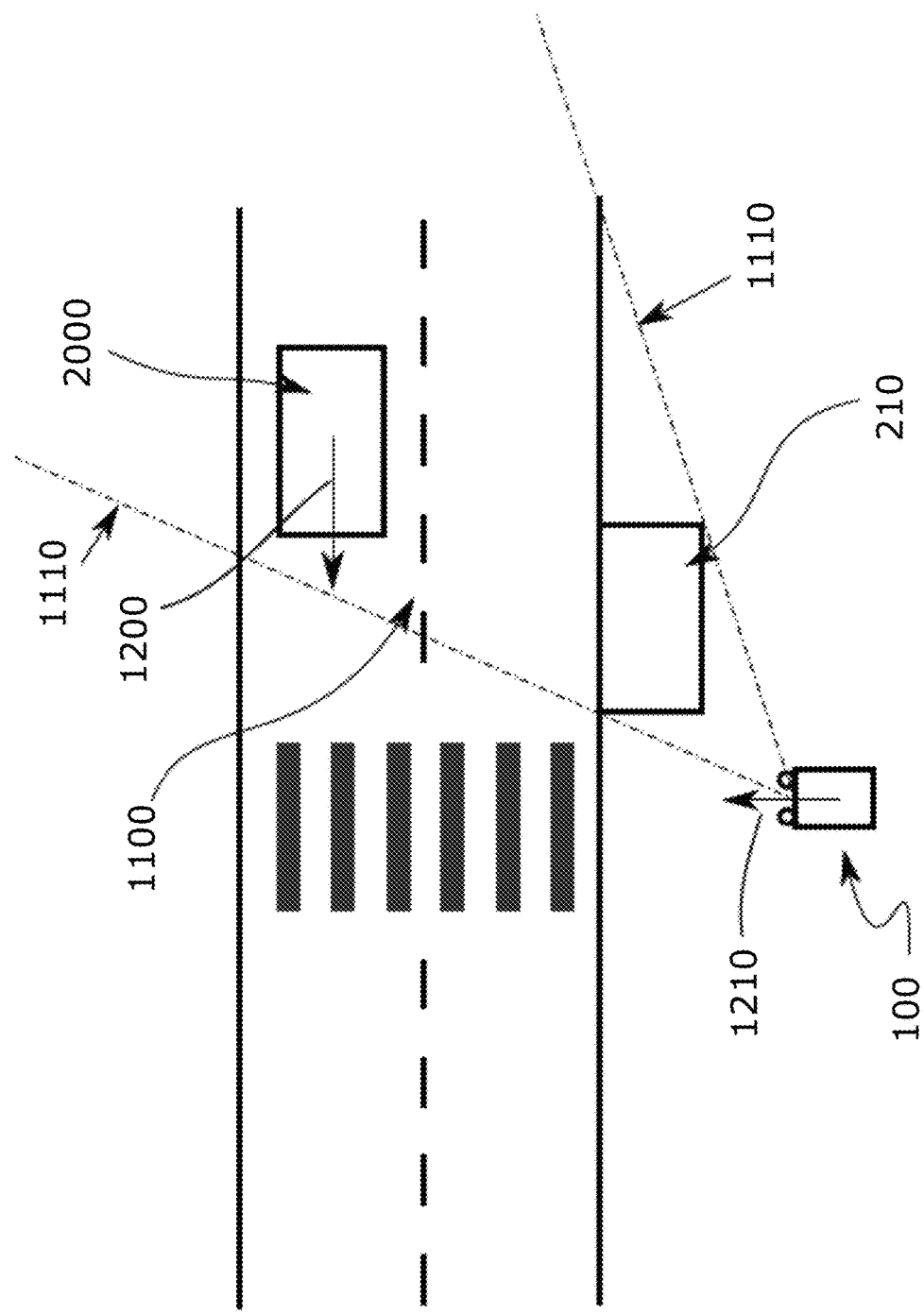
FIG. 6 depicts a schematic embodiment of occluding objects

FIG. 6 depicts an embodiment of an occluding obstacle as the mobile robot 100 attempts to cross a road.

Occluding obstacles 210 can comprise vehicles 210 parked on the side of the public roads. Since the robot 100 generally only looks for moving objects when deciding whether crossing a road will be safe, occluding obstacles 210, such as parked cars 210, can effectively prevent the robot 100 from assessing the true state of the road by blocking a part of the road. Therefore, before attempting automatic and autonomous crossing, the robot runs an "occluding obstacle scan" on the surroundings, that is, the mobile robot tries to detect if any occluding obstacle 210, such as parked cars 210, are positioned on the roadside and/or between the mobile robot 100 and the road. That is, any occlusion of the robot's vision may be detected. For example, stereo cameras may be used. Other sensors that may be used in that regard include TOF and/or ultrasonic sensors. Generally, all the surroundings may be detected. More specifically, all the directions that might occlude the vision of moving cars may be detected.

If a parked car (or another object occluding the robot's view onto the road) is detected, i.e., if an object is detected in a direction where the road is, the robot 100 may request an input from an operator, i.e., it may not cross the road automatically.

The vision of the mobile robot to the road may also be occluded by other objects or traffic participants as well, rather than the parked cars 210. In a similar scenario to the one depicted in FIG. 6, other objects and/or traffic participants may occlude the vision of the mobile robot 10 to the road, rather than a parked car 210. Such occlusions of the robot's vision may be caused by stationary and/or moving objects or traffic participants. For example, a tree may be positioned between the mobile robot 100 and the road thus occluding the vision of the mobile robot to the road. A group of people may be standing or walking on the road side and thus may occlude the vision of the robot to the road. Thus, occluding obstacles 210 (i.e. obstacles, such as objects or traffic participants, that occlude the robot's vision to the road) may comprise cars parked on the roadsides, traffic signs, trees, traffic participants (such as pedestrians, cyclers, etc.), buildings, etc. In general, any stationary and/or moving obstacle positioned on the road, roadside or sidewalk, particularly between the mobile robot 100 and the road, may occlude the vision of the mobile robot 100 to the road. In some instances, the detection of an occluding obstacle 210 may cause the mobile robot to request for assistance for crossing the road crossing.

Note, that the occluding obstacle 210 of FIG. 6 can also correspond to the occluding object 52 previously referred to with respect to the other figures.

In FIG. 6 a schematic representation of a scenario wherein an obstacle is positioned on the roadside is depicted. A mobile robot 100 is shown, wherein the mobile robot 100 is required to cross the road. In the scenario of FIG. 6 the road can be a public vehicle road. In the roadside, such as a parking place in the side of the road, or in the sidewalk, an occluding obstacle 210 is positioned. For example, a parked car 210 may be parked on the roadside. Or, at least one tree 210 and/or building 210 and/or traffic sign 210 and/or traffic participant 210 may be positioned between the mobile robot 100 and the road. In the road, a vehicle 2000 can be driving in the direction depicted by the arrow 1200.

As the mobile robot 100 requires to cross the road, it approaches the road wherein the mobile robot 100 is shown driving towards the road as indicated by the arrow 1210. The map data or the historical data that the mobile robot 100 may comprise or have access to can indicate to the mobile robot 100 that the road ahead of the mobile robot 100 (i.e. the road that the mobile robot 100 is required to pass) can be a public road (i.e. traffic is expected on the road, cars can be driving on the road). Thus, the mobile robot 100 looks for moving objects, that is, the mobile robot 100 tries to detect moving objects, preferably fast-moving objects such as vehicles 2000 on the road. It is advantageous for the mobile robot to detect the moving objects in its vicinity, such as moving cars on the road, as such detection can facilitate the decision whether to cross the road automatically and autonomously or to request assistance from a human operator. For example, if the mobile robot can detect a moving car on the road, then the mobile robot 100 will not cross the road in order to not obstruct the vehicles path, while the vehicle is moving. The mobile robot 100 may rather request for assistance from a human operator.

Figure 4:
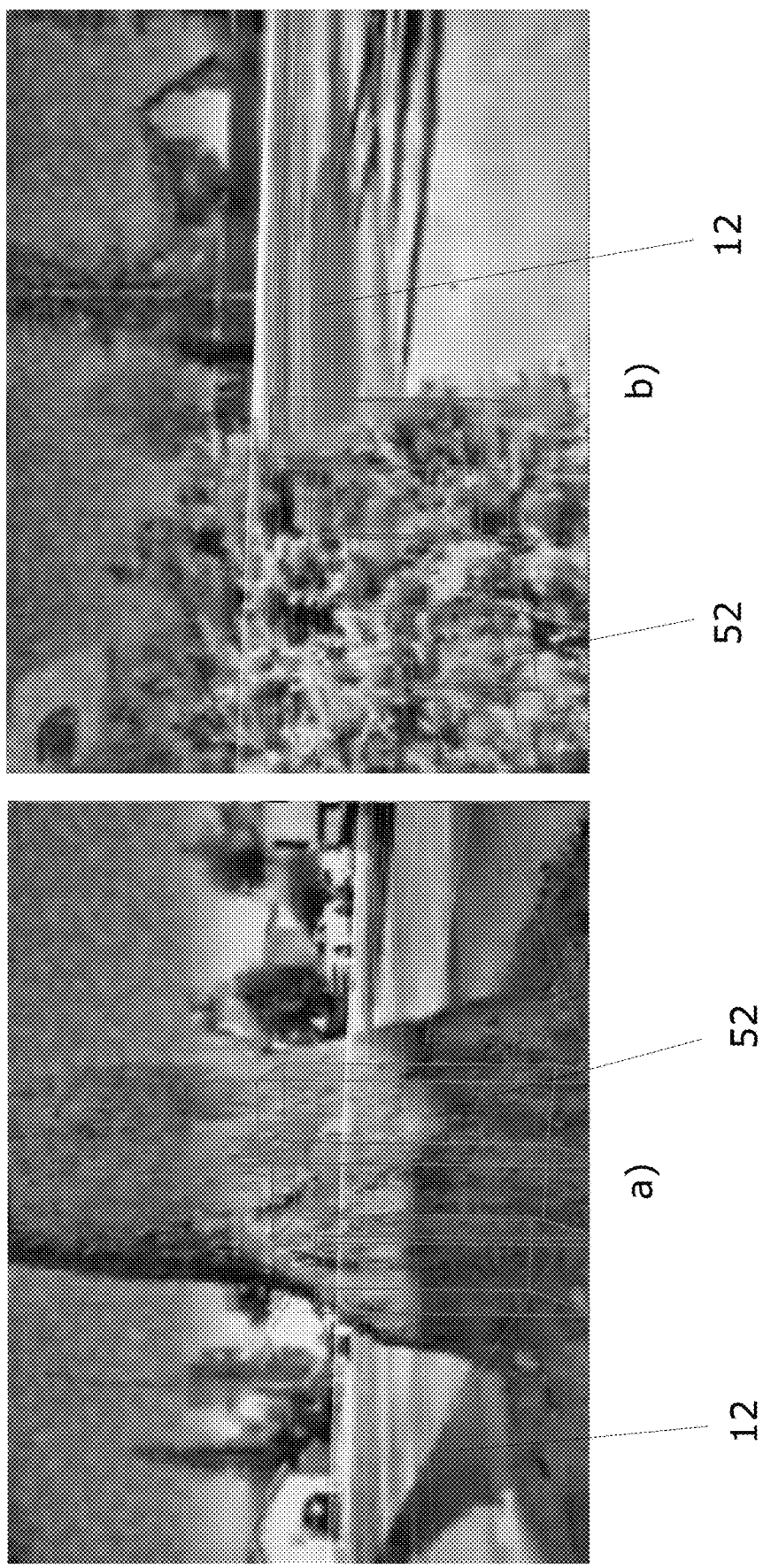
FIGS. 4a and 4b show another embodiment of detecting occlusion according to the present invention.

However, only looking for moving objects, such as moving vehicles on the road may not be enough. For example, a car may be parked on the roadside which can obstruct the view of the mobile robot 100 to the road. Or, a pedestrian or a group of pedestrians may be standing or walking on the sidewalk between the mobile robot 100 and the road. Such scenario is illustrated in FIG. 4. In the scenario of FIG. 4 if the mobile robot 100 can search for moving objects on the road it would not detect any. The reason for this is that a region of the road cannot be seen by the mobile robot 100 as the view is obstructed by the occluding obstacle 210. Thus, the region illustrated in FIG. 6 bounded by the dashed lines 1110, i.e. the blind spot 1100, is a region wherein the mobile robot 100 cannot have a clear view of the road. That is, the mobile robot 100 cannot know if in the blind spot 1100 there is a car 2000 or not driving in the road towards the road crossing. For example, in the scenario of FIG. 6, the mobile robot 100 cannot detect the vehicle 2000 as it is within the blind spot region 1100 of the mobile robot 100.

Thus, it can be advantageous that the mobile robot 100 can be configured to also detect occluding obstacles 210 such as the roadside parked cars 210. The presence of the roadside parked car 210, and in general of the occluding obstacles 210 between the mobile robot 100 and the road, can indicate to the mobile robot 100 that a blind spot 1100 can exist, i.e. a region of the road that the mobile robot 100 cannot see, thus cannot detect if there are moving vehicles 2000 or not. In some embodiments, if the mobile robot 100 can detect an occluding obstacle, e.g., a parked car 210, the mobile robot 100 can request for assistance for crossing the road. It will be understood that the parked car 210 is merely exemplary and that other objects, such as vans, trucks, containers, trees, traffic signs, buildings, etc., may also obstruct the robot's view onto the road. The view of the mobile robot onto the road may also be obstructed by other traffic participants, such as pedestrians, cyclers, or other mobile robots.

LIST OF REFERENCE NUMERALS

10—First sensor
12—Traffic road
20—Segments
22—Traffic road segment
30—Traffic road map data
32—Infinity points
40—Occlusion threshold
50—Detected occlusion
52—Occluding object
100—Mobile robot
102—robot body
104—motion component
106—headlights
108—signaling device
110—front camera
112—front stereo camera
113—front stereo camera
114—side stereo camera
115—side stereo camera
116—first processing component
118—first communication component
119—back stereo camera
200—Server
300—Memory component
400—Operator terminal
210—Occluding obstacle
1100—Blind spot
2000—Moving vehicle Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be the preferred order, but it may not be mandatory to carry out the steps in the recited order. That is, unless otherwise specified or unless clear to the skilled person, the order in which steps are recited may not be mandatory. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

The invention claimed is:

1. A method for operating a semi-autonomous or autonomous vehicle, the method comprising:
   the vehicle traveling in an outdoor setting;
   capturing data related to the outdoor setting via at least one first sensor;
   preprocessing captured data to identify areas of interest corresponding to at least one segment of the outdoor setting and to produce preprocessed data;
   identifying occlusion present in the preprocessed data;
   computing a distance range between the vehicle and the identified occlusion; and
   discarding the identified occlusion if a minimum possible distance between the vehicle and the identified occlusion is above a predetermined threshold.

2. The method according to claim 1, further comprising identifying a type of occlusion present in the preprocessed data.

3. The method according to claim 2, further comprising executing an action, wherein said action is selected based on the type of occlusion.

4. The method according to claim 1, further comprising contacting a remote operator terminal if the identified occlusion exceeds a predetermined parameter.

5. The method according to claim 4, further comprising the remote operator terminal assuming control of the vehicle after being contacted.

6. The method according to claim 1, wherein the at least one first sensor comprises at least one of a visual camera and a time-of-flight (ToF) sensor and the captured data comprises a plurality of frames captured by the at least one first sensor.

7. The method according to claim 1, wherein traveling in the outdoor setting comprises the vehicle traveling travelling on a pedestrian pathway.

8. The method of claim 1, wherein the vehicle comprises a mobile robot.

9. The method according to claim 1, further comprising comparing the preprocessed data with stored map data indicative of the at least one segment of the outdoor setting to identify occlusion present in the preprocessed data.

10. The method according to claim 9, wherein the stored map data comprises traffic road data and wherein the stored map data further comprises a road difficulty parameter for at least some roads.

11. The method according to claim 10, wherein comparing the preprocessed data with the stored map data further comprises identifying traffic roads with a road difficulty parameter exceeding a particular threshold in the preprocessed data.

12. The method according to claim 9, wherein comparing the preprocessed data with the stored map data comprises projecting the stored map data onto coordinates of the preprocessed data.

13. The method according to claim 12,
wherein the stored map data further comprises infinity points; and
wherein comparing the preprocessed data with the stored map data further comprises identifying a position of infinity points in the preprocessed data.

14. The method according to claim 1, wherein preprocessing captured data comprises segmenting the captured data, and wherein segmenting comprises dividing the captured data into a plurality of different area types.

15. The method according to claim 1, wherein identifying the occlusion comprises
assigning an occlusion score to each potential detected occlusion; and
comparing the occlusion score with a predetermined occlusion threshold and keeping occlusions with a score above the predetermined occlusion threshold.

16. The method according to claim 15, further comprising running a neural network-based algorithm on a combination of the preprocessed data and stored map data, and wherein the neural network-based algorithm is run on occlusions with an occlusion score above the predetermined occlusion threshold.

17. A system for operating a semi-autonomous or autonomous vehicle, the system comprising:
a vehicle configured to travel in outdoor settings and comprising at least one first sensor configured to capture data related to the outdoor settings; and
at least one processing component configured to:
preprocess data captured by the at least one first sensor to identify areas of interest corresponding to at least one section of an outdoor setting, and to produce preprocessed data; and
identify occlusion present in the preprocessed data;
compute a distance range between the vehicle and the identified occlusion; and
discard the identified occlusion if a minimum possible distance between the vehicle and the identified occlusion is above a predetermined threshold.

18. The system according to claim 17 further comprising a memory component configured to store map data indicative of the outdoor settings; and
wherein the processing component is further configured to compare the preprocessed data with the stored map data.

19. The system according to claim 17, further comprising a remote operator terminal, and wherein the remote operator terminal is configured to assume control of the vehicle when contacted upon detecting an occlusion exceeding a certain predetermined threshold.

20. A method for operating a semi-autonomous or autonomous vehicle, the method comprising:
traveling in an outdoor setting; and
capturing data related to the outdoor setting via at least one first sensor;
preprocessing captured data to identify areas of interest corresponding to at least one segment of the outdoor setting and to produce preprocessed data; and
identifying occlusion present in the preprocessed data; and
comparing the preprocessed data with stored map data indicative of the at least one segment of the outdoor setting to identify the occlusion present in the preprocessed data,
wherein comparing the preprocessed data with the stored map data comprises projecting the stored map data onto coordinates of the preprocessed data,
wherein the stored map data further comprises infinity points; and
wherein comparing the preprocessed data with the stored map data further comprises identifying a position of infinity points in the preprocessed data.

21. The method according to claim 20, wherein preprocessing captured data comprises segmenting the captured data, and wherein segmenting comprises dividing the captured data into a plurality of different area types.

22. The method according to claim 20, wherein the stored map data comprises traffic road data and wherein the stored map data further comprises a road difficulty parameter for each road.

23. The method according to claim 22, wherein comparing the preprocessed data with the stored map data further comprises identifying traffic roads with a road difficulty parameter exceeding a particular threshold in the preprocessed data.

24. The method according to claim 20, wherein identifying the occlusion comprises
assigning an occlusion score to each potential detected occlusion; and
comparing the occlusion score with a predetermined occlusion threshold and keeping occlusions with a score above the predetermined occlusion threshold.

25. The method according to claim 24, further comprising running a neural network-based algorithm on a combination of the preprocessed data and stored map data, and wherein the neural network-based algorithm is run on occlusions with an occlusion score above the predetermined occlusion threshold.

26. The method according to claim 20, further comprising:
computing a distance range between the vehicle and the identified occlusion; and
discarding the identified occlusion if a minimum possible distance between the vehicle and the identified occlusion is above a predetermined threshold.

27. The method according to claim 20, further comprising identifying a type of occlusion present in the preprocessed data.

28. The method according to claim 27, further comprising executing an action, wherein said action is selected based on the type of occlusion.

29. The method according to claim 20, further comprising contacting a remote operator terminal when the identified occlusion exceeds a predetermined parameter.

30. The method according to claim 29, further comprising the remote operator terminal assuming control of the vehicle after being contacted.

31. The method according to claim 20, wherein the at least one first sensor comprises at least one of a visual camera and a time-of-flight (ToF) sensor, and the captured data comprises a plurality of frames captured by the at least one first sensor.

32. The method according to claim 20, wherein traveling in the outdoor setting comprises the vehicle traveling on a pedestrian pathway.

33. The method of claim 20, wherein the vehicle comprises a mobile robot.

34. A method for operating a semi-autonomous or autonomous vehicle, the method comprising
the vehicle traveling on a pedestrian pathway;
the vehicle capturing depth sensor images with at least one depth sensor;
identifying objects in the depth sensor images;
comparing captured images with stored map data to identify at least one predetermined road;
detecting occlusion by at least one identified object on a path of the vehicle between the vehicle and the at least one predetermined road;
computing a distance range between the vehicle and the detected occlusion; and
discarding the detected occlusion if a minimum possible distance between the vehicle and the occlusion is above a predetermined threshold.

35. A method for operating a semi-autonomous or autonomous vehicle, the method comprising:
the vehicle traveling in an outdoor setting;
capturing data related to the outdoor setting via at least one first sensor;
preprocessing captured data to identify areas of interest corresponding to at least one segment of the outdoor setting and to produce preprocessed data;
identifying occlusion present in the preprocessed data; and
comparing the preprocessed data with stored map data indicative of the at least one segment of the outdoor setting to identify the occlusion present in the preprocessed data,
wherein the stored map data comprises traffic road data and wherein the stored map data further comprises a road difficulty parameter for at least some roads, and
wherein comparing the preprocessed data with the stored map data further comprises identifying traffic roads with a road difficulty parameter exceeding a particular threshold in the preprocessed data.

36. The method according to claim 35, wherein preprocessing captured data comprises segmenting the captured data, and wherein segmenting comprises dividing the captured data into a plurality of different area types.

37. The method according to claim 35, wherein comparing the preprocessed data with the stored map data comprises projecting the stored map data onto coordinates of the preprocessed data.

38. The method according to claim 37,
wherein the stored map data further comprises infinity points; and
wherein comparing the preprocessed data with the stored map data further comprises identifying a position of infinity points in the preprocessed data.

39. The method according to claim 35, wherein identifying the occlusion comprises
assigning an occlusion score to each potential detected occlusion; and
comparing the occlusion score with a predetermined occlusion threshold and keeping occlusions with a score above the predetermined occlusion threshold.

40. The method according to claim 39, further comprising running a neural network-based algorithm on a combination of the preprocessed data and stored map data, and wherein the neural network-based algorithm is run on occlusions with an occlusion score above the predetermined occlusion threshold.

41. The method according to claim 35, further comprising identifying a type of occlusion present in the preprocessed data.

42. The method according to claim 41, further comprising executing an action, wherein said action is selected based on the type of occlusion.

43. The method according to claim 35, further comprising contacting a remote operator terminal if the identified occlusion exceeds a predetermined parameter.

44. The method according to claim 43, further comprising the remote operator terminal assuming control of the vehicle after being contacted.

45. The method according to claim 35, wherein the at least one first sensor comprises at least one of a visual camera and a time-of-flight (ToF) sensor, and the captured data comprises a plurality of frames captured by the at least one first sensor.

46. The method according to claim 35, wherein traveling in the outdoor setting comprises the vehicle traveling on a pedestrian pathway.

47. The method of claim 35, wherein the vehicle comprises a mobile robot.

48. A system comprising:
a semi-autonomous or autonomous vehicle configured to travel in outdoor settings and comprising at least one first sensor configured to capture data related to the outdoor settings; and
at least one processing device configured to:
preprocess data captured by the at least one first sensor to identify areas of interest corresponding to at least one segment of an outdoor setting, and to produce preprocessed data;
identify occlusion present in the preprocessed data; and
compare the preprocessed data with stored map data indicative of the at least one segment of the outdoor setting to identify the occlusion present in the preprocessed data, wherein the stored map data comprises traffic road data and wherein the stored map data further comprises a road difficulty parameter for at least some roads, and wherein the at least one processing device is configured to identify traffic roads with a road difficulty parameter exceeding a particular threshold in the preprocessed data.

49. The system according to claim 48, further comprising a memory component configured to store map data indicative of the outdoor settings.

50. The system according to claim 48, further comprising a remote operator terminal, and wherein the remote operator terminal is configured to assume control of the vehicle when contacted upon detecting an occlusion exceeding a certain predetermined threshold.

51. The system of claim 48, wherein the vehicle comprises a mobile robot.

52. A method comprising a semi-autonomous or autonomous vehicle traveling on a pedestrian pathway in an outdoor setting;

the vehicle capturing depth sensor images with at least one depth sensor;

preprocessing captured data to identify areas of interest corresponding to at least one segment of the outdoor setting and to produce preprocessed data; and identifying objects in the depth sensor images;

comparing captured images with stored map data to identify at least one predetermined road; and detecting occlusion by at least one identified object on a path of the vehicle between the vehicle and the at least one predetermined road; and comparing the preprocessed data with stored map data indicative of the at least one segment of the outdoor setting to detect occlusion present in the preprocessed data, wherein the stored map data comprises traffic road data and wherein the stored map data further comprises a road difficulty parameter for at least some roads, and wherein comparing the preprocessed data with the stored map data further comprises identifying traffic roads with a road difficulty parameter exceeding a particular threshold in the preprocessed data.

53. The method of claim 52, wherein the vehicle comprises a mobile robot.

* * * * *